United States Patent [19]

Zenda et al.

[11] Patent Number: 5,448,260
[45] Date of Patent: Sep. 5, 1995

[54] COLOR LCD DISPLAY CONTROL SYSTEM

[75] Inventors: Hiroki Zenda; Hajime Shimamoto, both of Tokyo, Japan

[73] Assignee: Kabushiki Kaisha Toshiba, Kawasaki, Japan

[21] Appl. No.: 261,291

[22] Filed: Jun. 16, 1994

Related U.S. Application Data

[63] Continuation of Ser. No. 696,076, May 6, 1991, abandoned.

[30] Foreign Application Priority Data

May 7, 1990 [JP] Japan ................... 2-117350
May 31, 1990 [JP] Japan ................... 2-142007

[51] Int. Cl.6 ............................................. G09G 3/36
[52] U.S. Cl. ..................... 345/100; 345/132; 345/204
[58] Field of Search ............... 345/1, 2, 98, 100, 132, 345/204; 348/490-492, 528, 529-530, 540-546

[56] References Cited

U.S. PATENT DOCUMENTS

| | | | |
|---|---|---|---|
| 3,928,845 | 12/1975 | Clark | 340/324 |
| 4,121,283 | 10/1978 | Walker | 364/200 |
| 4,344,021 | 8/1982 | Johnston | 315/383 |
| 4,399,524 | 8/1983 | Muguruma et al. | 365/229 |
| 4,422,163 | 12/1983 | Oldenkamp | 365/229 |
| 4,430,649 | 2/1984 | Leininger | 340/731 |
| 4,454,593 | 6/1984 | Fleming et al. | 364/900 |
| 4,536,856 | 8/1985 | Hiroishi | 364/900 |
| 4,566,005 | 1/1986 | Apperley et al. | 340/771 |
| 4,574,279 | 3/1986 | Roberts | 340/731 |
| 4,611,203 | 9/1986 | Criscimagna et al. | 340/773 |
| 4,628,534 | 12/1986 | Marshall | 382/41 |
| 4,679,038 | 7/1987 | Bantz et al. | 340/721 |
| 4,730,186 | 3/1988 | Koga et al. | 340/708 |
| 4,751,502 | 6/1988 | Ishii et al. | 340/709 |
| 4,760,387 | 7/1988 | Ishii et al. | 340/716 |
| 4,763,279 | 8/1988 | Kellam et al. | 364/518 |
| 4,764,975 | 8/1988 | Inoue | 382/47 |
| 4,769,852 | 9/1988 | Hashimoto et al. | 382/45 |
| 4,837,621 | 6/1989 | Yug | 358/148 |
| 4,847,788 | 7/1989 | Shimada | 364/522 |
| 4,860,246 | 8/1989 | Inoue | 364/900 |
| 4,891,705 | 1/1990 | Suzuki et al. | 358/148 |
| 4,901,140 | 2/1990 | Lang et al. | 358/64 |
| 4,926,166 | 5/1990 | Fujisawa et al. | 340/717 |
| 4,965,563 | 10/1990 | Mano | 340/784 |
| 4,998,099 | 3/1991 | Ishii | 340/784 |
| 5,018,076 | 5/1991 | Johary et al. | 345/1 |
| 5,057,928 | 10/1991 | Nagashima et al. | 358/148 |

FOREIGN PATENT DOCUMENTS

| | | |
|---|---|---|
| 0195203 | 9/1986 | European Pat. Off. . |
| 0295690 | 12/1988 | European Pat. Off. . |
| 0344621 | 12/1989 | European Pat. Off. . |
| 3718078 | 12/1987 | Germany . |
| 3-3234 | 5/1982 | Japan . |
| 2223652 | 4/1990 | United Kingdom . |

OTHER PUBLICATIONS

Operation Manual—Egawonder.
IBM Personal Computer, IBM Enhanced Graphics Adapter, pp. 1-74, published Aug. 2, 1984.
PEGA 2 User's Guide, 50208, Rev. 4, Paradise Systems, Inc. pp. 2-61, published 1986.

*Primary Examiner*—Richard Hjerpe
*Assistant Examiner*—Steven J. Saras
*Attorney, Agent, or Firm*—Finnegan, Henderson, Farabow, Garrett & Dunner

[57] ABSTRACT

A value obtained by adding a back porch period following a vertical sync signal output from a CRT controller to the total number of horizontal display lines of a display resolution is set in a register. A counter counts the value set in the register in synchronism with a horizontal sync signal, and outputs a scanning start signal to a Y driver. With this operation, when a designated display resolution is lower than the physical resolution of an LCD, the scanning start signal is output before scanning of all the physical display lines of the LCD is completed. As a result, upper and lower non-display portions on the LCD display screen are simultaneously scanned.

10 Claims, 23 Drawing Sheets

FIG. 2A (PRIOR ART) LP
FIG. 2B (PRIOR ART) DATA
FIG. 3A (PRIOR ART) LP
FIG. 3B (PRIOR ART) LINE
FIG. 3C (PRIOR ART) FP

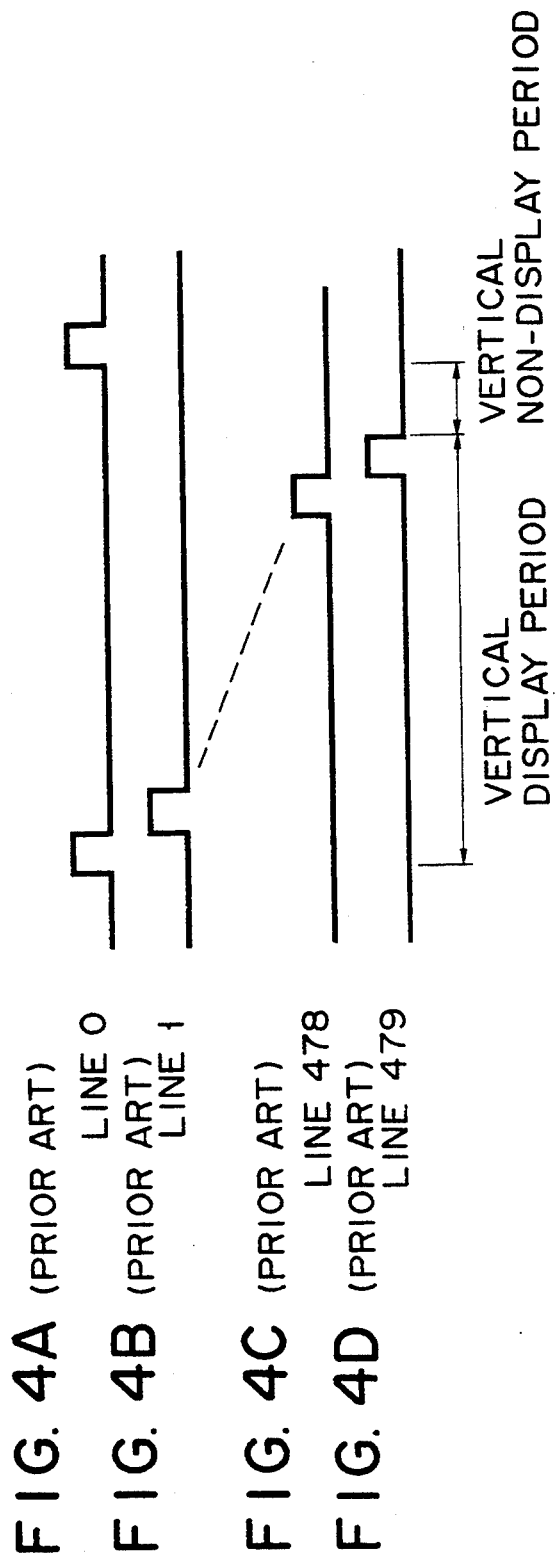

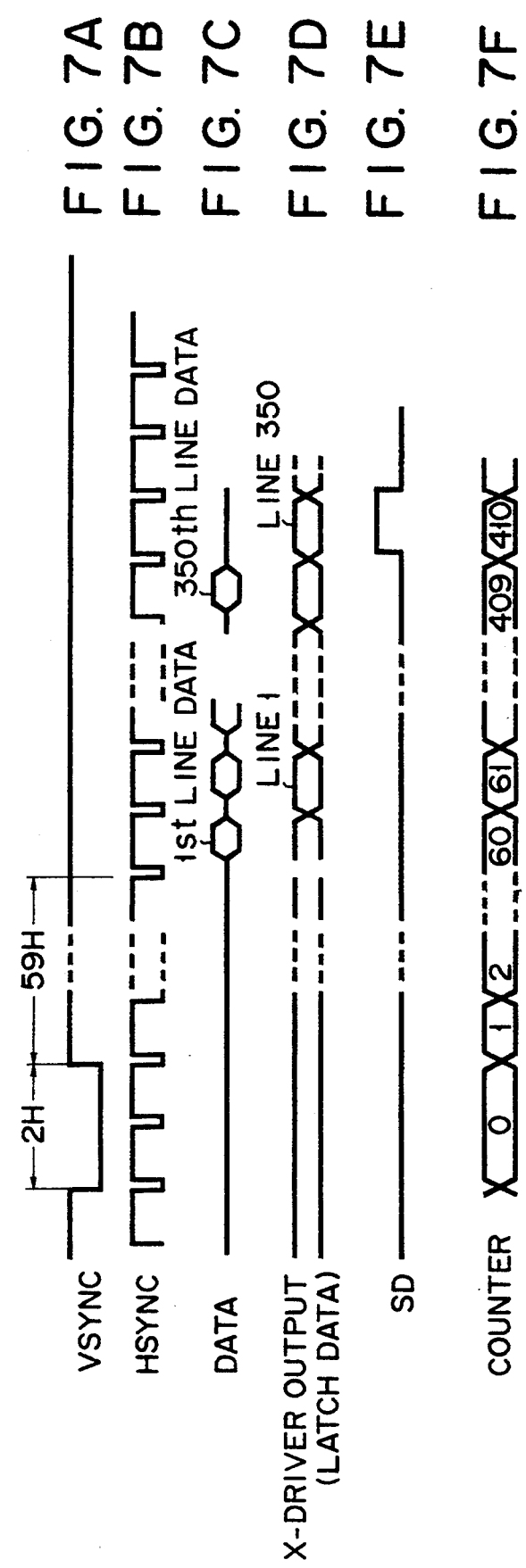

480 LINE MODE 640 x 480

640 x 400

640 x 350

|  | 640 x 480 | 640 x 400 | 640 x 350 |
|---|---|---|---|
| VSYNC POLARITY | NEGATIVE ⊓⊓ | POSITIVE ⊔⊔ | NEGATIVE ⊓⊓ |
| HSYNC POLARITY | NEGATIVE ⊓⊓ | NEGATIVE ⊓⊓ | POSITIVE ⊔⊔ |
| t1 | 16.683ms(525H) | 14.268ms(449H) | 14.268ms(449H) |
| t2 | 0.064ms( 2H) | 0.064ms( 2H) | 0.064ms( 2H) |
| t3 | 1.017ms( 32H) | 1.080ms( 34H) | 1.875ms( 59H) |
| t4 | 15.253ms(480H) | 12.711ms(400H) | 11.122ms(350H) |
| t5 | 0.350ms( 11H) | 0.413ms( 13H) | 1.208ms( 38H) |
| t6 | 3.813ms( 96D) | 3.813ms( 96D) | 3.813ms( 96D) |
| t7 (1H) | 31.778μs(800D) | 31.778μs(800D) | 31.778μs(800D) |
| t8 | 3.813μs( 96D) | 3.813μs( 96D) | 3.813μs( 96D) |
| t9 | 1.907μs( 48D) | 1.907μs( 48D) | 1.907μs( 48D) |
| t10 | 25.422μs(640D) | 25.422μs(640D) | 25.422μs(640D) |
| t11 | 0.636μs( 16D) | 0.636μs( 16D) | 0.636μs( 16D) |

F I G. 10

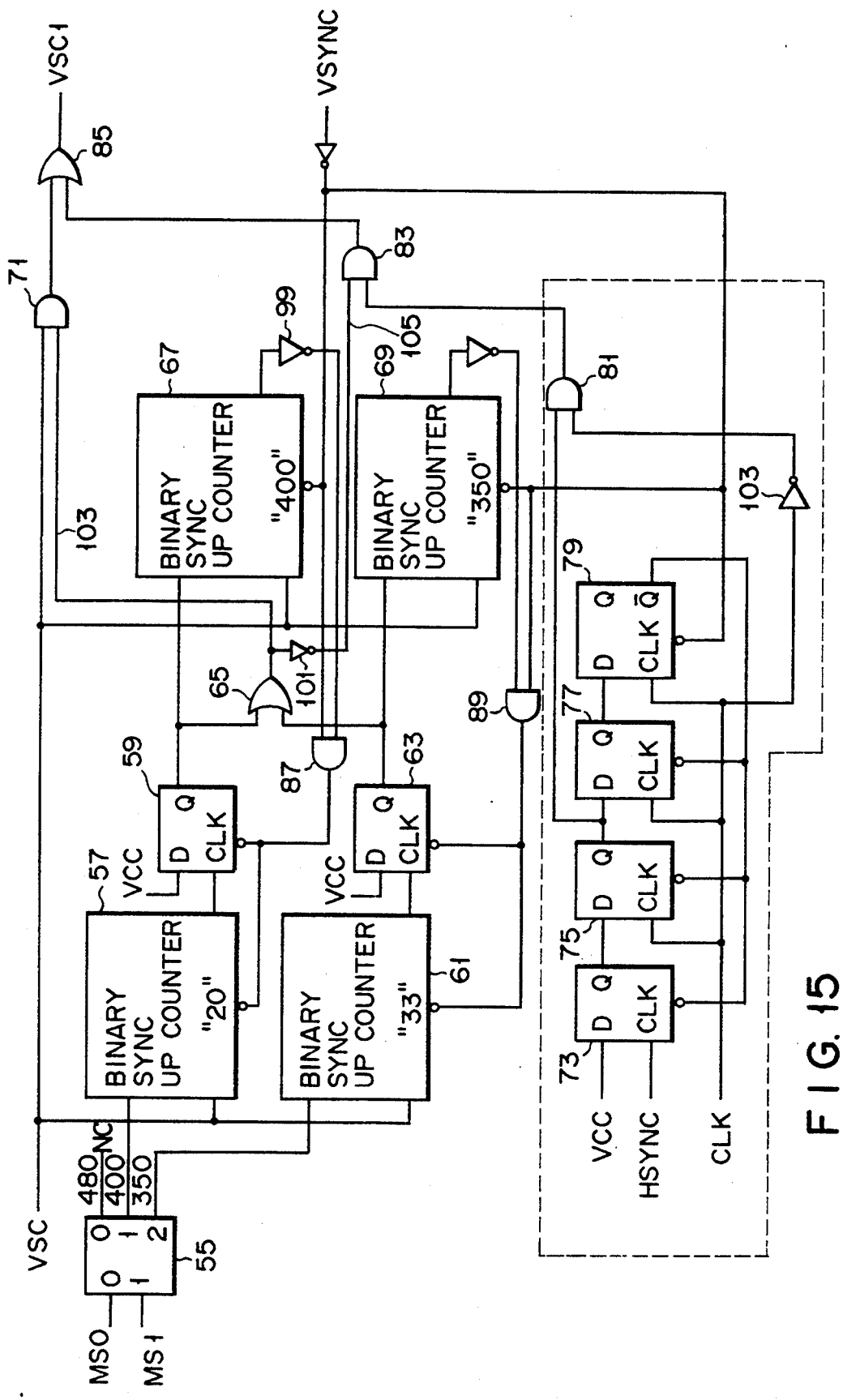
F I G. 15

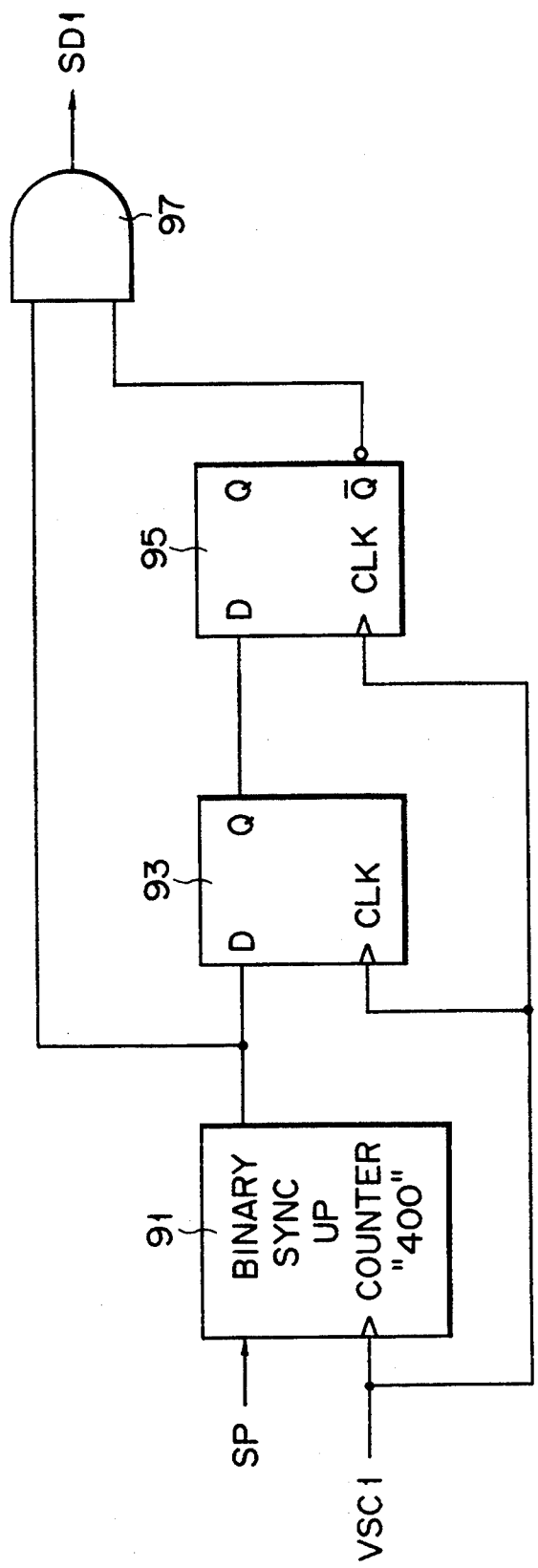
F I G. 20

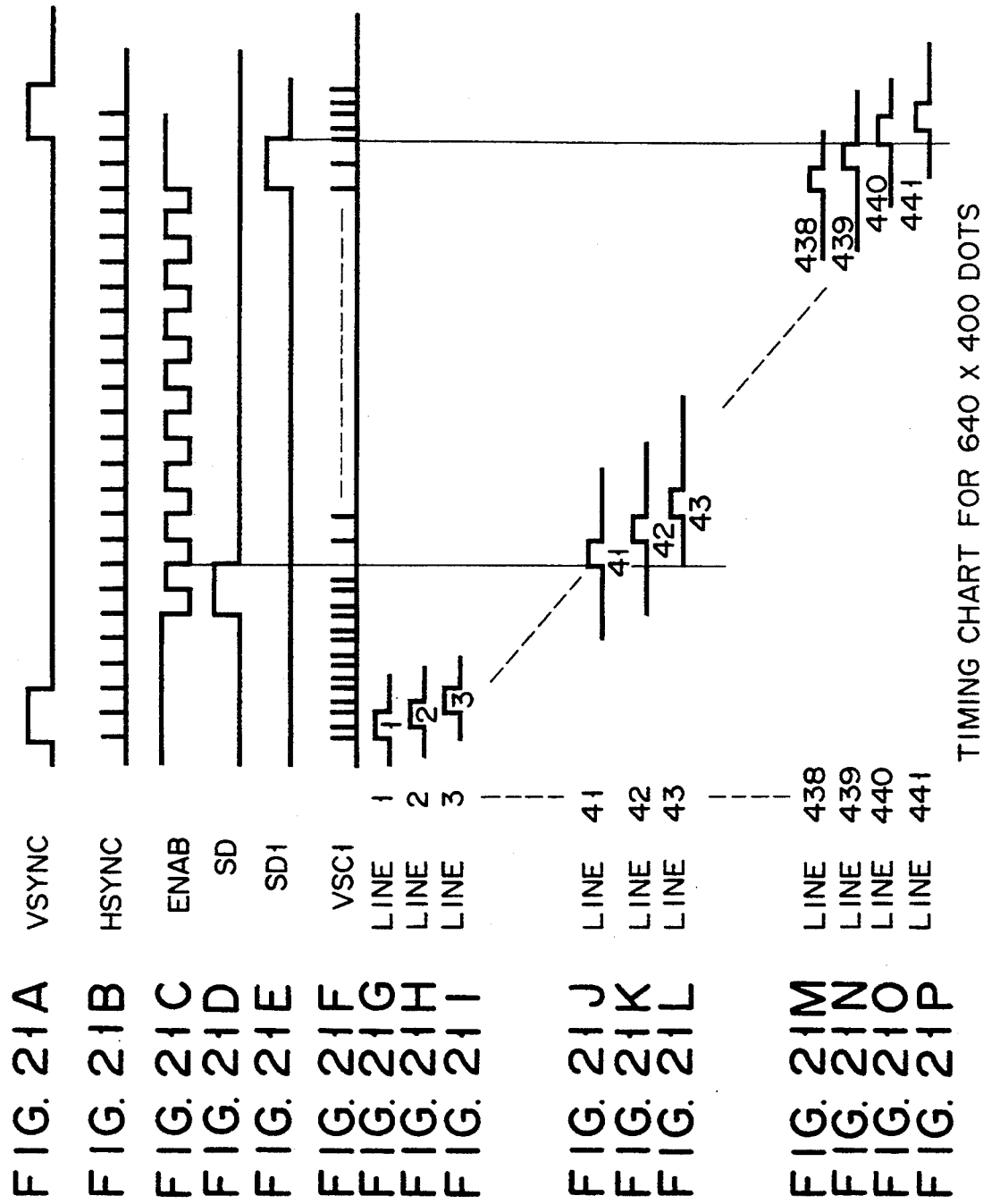

COLOR LCD DISPLAY CONTROL SYSTEM

This application is a continuation of application Ser. No. 07/696,076, filed May 6, 1991, now abandoned.

BACKGROUND OF THE INVENTION

1. Field of the Invention

The present invention relates to a display control system for performing display/drive control of a flat panel display such as an LCD (Liquid Crystal Display) at the CRT display timing of a CRT (Cathode Ray Tube) controller.

2. Description of the Related Art

In a conventional system, display control of a CRT display requires a vertical sync signal and a vertical blanking period. In contrast to this, display control of an LCD does not require a long vertical blanking period as in CRT display drive. For this reason, LCD and CRT displays have different display timings for display/drive operations.

If, therefore, a laptop personal computer having, e.g., an LCD is designed to allow connection of a CRT display as an option, a display timing circuit specially designed for an LCD display drive and a display timing circuit specially designed for a CRT display drive must be independently prepared. In addition, since a circuit for switching the display timing circuits is required, the arrangement of the computer is considerably complicated.

Furthermore, when an LCD is applied to a plurality of different types of display resolutions (e.g., 640×350 dots, 640×400 dots, and 640×480 dots) with different numbers of display lines (total horizontal display line counts in the vertical direction), an interface circuit for switching the display resolutions is required. Therefore, the arrangement of the interface circuit is complicated. The above prior art will be described below with reference to FIGS. 1 through 4D.

FIG. 1 is a block diagram showing a circuit arrangement of a conventional LCD. In the conventional arrangement shown in FIG. 1, an X driver 1 and a Y driver 3 are driven/controlled by various types of timing signals, and display data loaded in a shift register in the X driver 1 is displayed on an LCD panel 5. The above-mentioned timing signals include a latch pulse LP corresponding to a one-line period, a field pulse FP corresponding to a one-frame period, and a shift clock SCK for loading data in the shift register in the X driver 1. Note that signal lines 9 extending from the x driver 1 and signal lines 7 extending from the Y driver 3 are arranged in the LCD panel 5 in the form of a matrix.

In the LCD having such an arrangement, specific lines of the LDC panel 5 are selected by shift clock pulses generated by the Y driver 3 and supplied through the signal lines 7, and data output from the X driver 1 through the signal lines 9 are respectively supplied to the selected pixels, thus displaying the data on the screen.

FIGS. 2A through 4D are timing charts of signals in the vertical and horizontal directions in a case wherein a display resolution of 640×480 dots is set. FIGS. 2A and 2B are timing charts in the horizontal direction of a CRT display. FIGS. 3A through 3C are timing charts in the vertical direction of the CRT display. According to the timing in the horizontal direction shown in FIGS. 2A and 2B, the latch pulse LP shown in FIG. 2A is input in a horizontal non-display period shown in FIG. 2B. In the timing charts in the horizontal direction, after 480 lines (0–479) shown in FIG. 3B are displayed, a vertical non-display period appears, as shown in FIG. 3C.

FIGS. 4A through 4D are timing charts of the LCD. Display data of all the lines of one frame are sequentially output from the X driver 1 in units of lines. The display data is supplied to the LCD panel 5 through the signal lines 9, and one frame is formed in [vertical display period + vertical non-display period].

The LCD requires no non-display period in consideration of the principle of driving operation (i.e., display data is latched in the X driver 1, specific lines are selected by the Y driver 3, and the X driver 1 sequentially displays the data through pixels corresponding to the selected lines). For this reason, the operation timing of the conventional LCD is set such that a non-display period is minimized. That is, the operation timing of the LCD is independently set and is different from that of the CRT display. Therefore, in a conventional laptop personal computer which has a standardized LCD and allows connection of a CRT display as an option, display timings for an LCD and an CRT display are independently generated and set in a CRT display controller. In such an arrangement, however, the LCD and the CRT display cannot be simultaneously driven to display information.

Furthermore, if a system has a plurality of display resolutions, the following problem is posed. Assume that the total number of horizontal display lines in the vertical direction of a frame to be displayed on the LCD (vertical display period + vertical non-display period) is smaller than the number of display dots (the physical resolution of the LCD) on the LCD in the vertical direction (for example, 640×400-dot display is performed by using an LCD having a display resolution of 640×480 dots). In this case, since non-display regions, each corresponding to 40 lines, are formed in upper and lower portions of the physical screen, a display interface circuit including a display timing generating circuit is considerably complicated.

In addition, a plurality of display resolutions are generally set in a system on the assumption that display operations are performed by a CRT display. For this reason, a vertical display period and a vertical non-display period are set for the CRT display. If, therefore, a 640×480-dot LCD is used to display a frame having another resolution (e.g., 640×400 dots), lines corresponding to pixels for which no display data are provided may not be driven. However, if the lines are not driven, inappropriate voltages are applied to liquid crystal portions corresponding to the lines, resulting in a deterioration in display quality. For this reason, in a conventional system, display timing signals for the respective display resolutions in a CRT display, and display timing signals for the respective display resolutions in an LCD are generated and set in a CRT controller, respectively. That is, a conventional LCD is driven at the optimal display timings for the LCD. Therefore, simultaneous display operations of the CRT display and the LCD cannot be performed.

SUMMARY OF THE INVENTION

It is an object of the present invention to provide a flat panel display control system which can drive an LCD with a plurality of display resolutions by using the display timings of a CRT display, and can perform simultaneous display operations of the CRT display and the LCD.

According to the first aspect of the present invention, there is provided a flat panel display control system for a flat panel display unit which can be operated in each mode selected from a plurality of display modes and for a cathode ray tube (CRT) display unit as an option, comprising a CRT controller for outputting vertical and horizontal sync signals for controlling a display timing of the CRT display unit, the flat panel display unit comprising: means for discriminating a designated display resolution; means for generating a scanning start signal corresponding to the display resolution discriminated by the discriminating means, and outputting the scanning start signal to the flat panel display unit; and means for simultaneously scanning non-display regions of the flat panel display in accordance with the scanning start signal from the scanning start signal generating means.

According to the second aspect of the present invention, there is provided a display system comprising: a liquid crystal display (LCD) having predetermined numbers of display dots in vertical and horizontal directions; and means for simultaneously scanning a plurality of lines in non-display regions when data is to be displayed on the LCD while the number of dots in at least one of the vertical and horizontal directions is set to be smaller than the number of dots of the LCD in a corresponding direction.

According to the third aspect of the present invention, there is provided a flat panel display control system for a flat panel display unit which can be operated in each mode selected from a plurality of display modes and for a cathode ray tube (CRT) display unit as an option, comprising a CRT controller for outputting vertical and horizontal sync signals for controlling a display timing of the CRT display unit and a signal representing a valid display period of the flat panel display unit, the flat panel display unit comprising: means for generating a scanning start signal corresponding to a display resolution on the basis of the signal, output from the CRT controller, representing the valid display period of the flat panel display unit, and outputting the scanning start signal to the flat panel display unit, and means for simultaneously scanning non-display regions of the flat panel display in accordance with the scanning start signal from the scanning start signal generating means.

According to the fourth aspect of the present invention, there is provided a flat panel display control system for a flat panel display unit which can be operated in each mode selected from a plurality of display modes and for a cathode ray tube (CRT) display unit as an option, comprising a CRT controller for outputting vertical and horizontal sync signals for controlling a display timing of the CRT display unit, the flat panel display unit comprising: means for discriminating a designated display resolution; and means for scanning non-display regions of the flat panel display unit a plurality of times during a period corresponding to a one-line scan period in a valid display region of the flat display unit in accordance with the display resolution discriminated by the discriminating means.

According to the fifth aspect of the present invention, there is provided a display system comprising: a liquid crystal display (LCD) having predetermined numbers of display dots in vertical and horizontal directions; and means for simultaneously scanning a plurality of lines in non-display regions during a period corresponding to a one-line scan in the valid display region when data is to be displayed on the LCD while the number of dots in at least one of the vertical and horizontal directions is set to be smaller than the number of dots of the LCD in a corresponding direction.

According to the sixth aspect of the present invention, there is provided a flat panel display control system for a flat panel display unit which can be operated in each mode selected from a plurality of display modes and for a cathode ray tube (CRT) display unit as an option, comprising a CRT controller for outputting vertical and horizontal sync signals for controlling a display timing of the CRT display unit and a signal representing a valid display period of the flat panel display unit, the flat panel display unit comprising: means for generating a scanning start signal corresponding to a display resolution on the basis of the signal, output from the CRT controller, representing the valid display period of the flat panel display unit, and outputting the scanning start signal to the flat panel display unit; and means for scanning non-display regions of the flat panel display unit a plurality of times during a period corresponding to a one-line scan period in a valid display region in accordance with the scanning start signal from the scanning start signal generating means.

According to the present invention, when the display resolution of a designated display mode is lower than the physical display resolution of the LCD, upper and lower non-display portions on the physical screen are simultaneously scanned. With this operation, display operations of the LCD with a plurality of display resolutions can be performed at CRT display timings. Therefore, display operations can be performed in a plurality of display resolution modes, in which total horizontal display line counts are smaller than the physical vertical display dot count of the LCD, by using the CRT display timing without changing an application program and a basic input and output system (BIOS) designed for the CRT display. In addition, since the LCD can be driven by using the display timing of the CRT display, a simultaneous display operation of the LCD and the CRT display can be performed.

Furthermore, according to the present invention, when a display operation of the LCD is to be performed with a resolution lower than the vertical resolution of the LCD, a line scan in regions other than a valid display region is performed twice during a period corresponding to a one-line scan in the valid display region. With this operation, scanning of the non-display regions of the LCD is performed within the display timing of the CRT display (a vertical non-display period). Therefore, display operations of the LCD can be performed by using the display timings of the CRT display in a plurality of types of display modes in which total horizontal lines in the vertical direction (a vertical non-display period + a horizontal non-display period) is smaller than the physical vertical display dot count of the LCD.

Moreover, since display software (BIOS and application software) designed for the CRT display can be applied to the LCD without any modifications, software can be effectively used, thus providing an economically advantageous arrangement.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A through 4D are timing charts of signals in the vertical and horizontal directions in a case of a display resolution of 640×480 dots, in which FIGS. 2A and 2B are timing charts in the horizontal direction of a CRT display, FIGS. 3A through 3C are timing charts in the vertical direction of the CRT display, and FIGS. 4A through 4D are timing charts of an LCD;

FIGS. 7A through 7G are timing charts showing an operation of the embodiment shown in FIG. 6, in which FIG. 7A shows a vertical sync signal, FIG. 7B shows a horizontal sync signal, FIG. 7C shows display line data, FIG. 7D shows an X driver output (latch data), FIG. 7E shows scanning data (SD), FIG. 7F shows a counter output, and FIG. 7G is a Y-driver output;

FIGS. 8A through 8C are views respectively showing line scan operations with different display resolutions in the embodiment shown in FIG. 6, in which FIG. 8A shows a line scan operation in a 350 line mode, FIG. 8B shows a line scan operation in a 400 line mode, and FIG. 8C shows a line scan operation in a 480 line mode;

FIGS. 9A through 9C are views respectively showing display and non-display regions with different display resolutions, in which FIG. 9A shows a case of 640×480 dots, FIG. 9B shows a case of 640×400 dots, and FIG. 9C shows a case of 640×350 dots;

FIG. 10 is a view showing the set duration of each signal in the respective display modes shown in FIG. 9A through 9C;

FIGS. 14A through 14G are timing charts of signals used by the Y-driver timing generator in FIG. 13, in which FIG. 14A shows a horizontal sync signal, FIG. 14B shows a vertical sync signal, FIG. 14C shows an enable signal, FIG. 14D shows an output signal from an F/F 43, FIG. 14E shows a vertical shift clock signal, FIG. 14F shows an output from an F/F 47, and FIG. 14G shows scanning data;

FIG. 15 is a block diagram showing an arrangement of a vertical shift clock (VSC1) generator arranged in the Y-driver timing generator;

FIG. 20 is a block diagram showing a scanning data generator in the Y driver in FIG. 12; and FIGS. 21A through 21P are timing charts showing the respective line scanning timings in case of a display resolution of 640×400 dots according to the second embodiment.

DETAILED DESCRIPTION OF THE PREFERRED EMBODIMENTS

Figure 1:
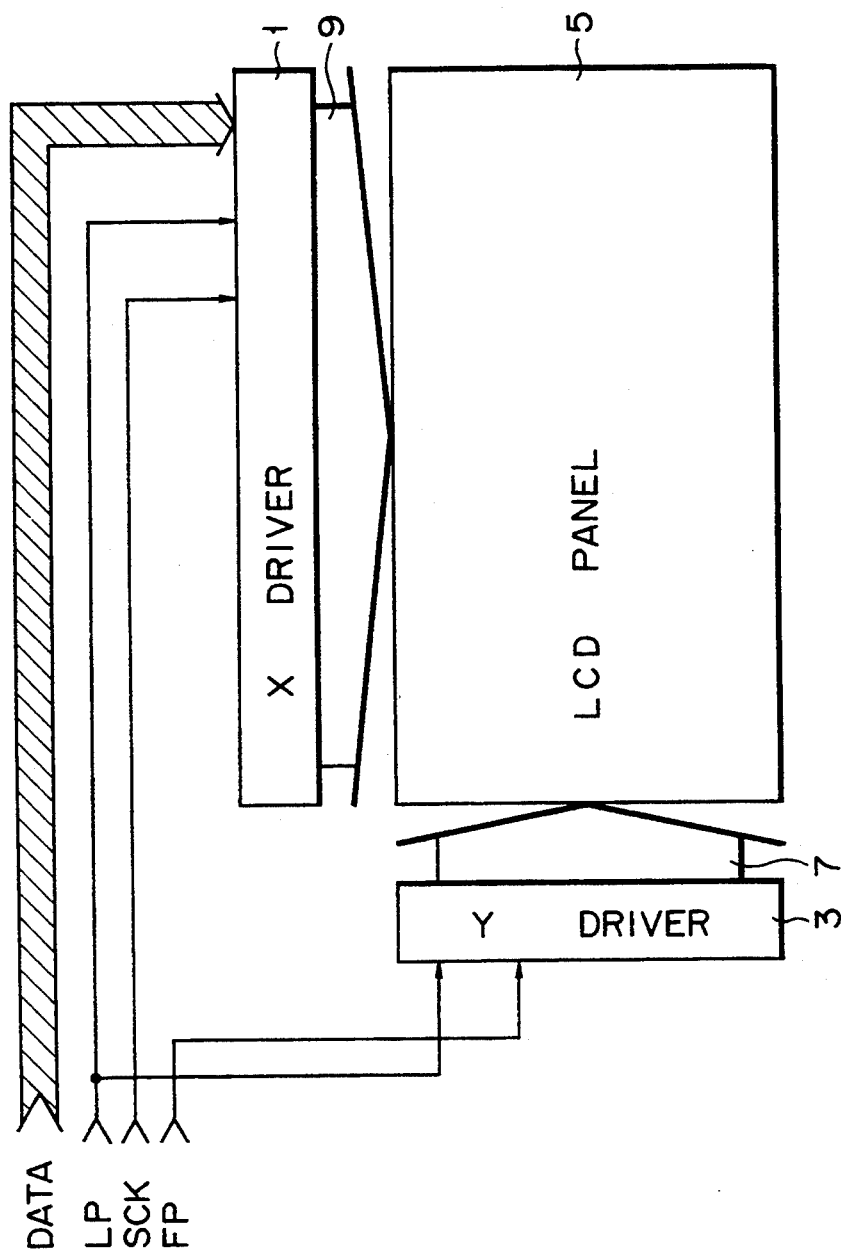
FIG. 1 is a block diagram showing a circuit arrangement of a conventional LCD.
Figure 5:
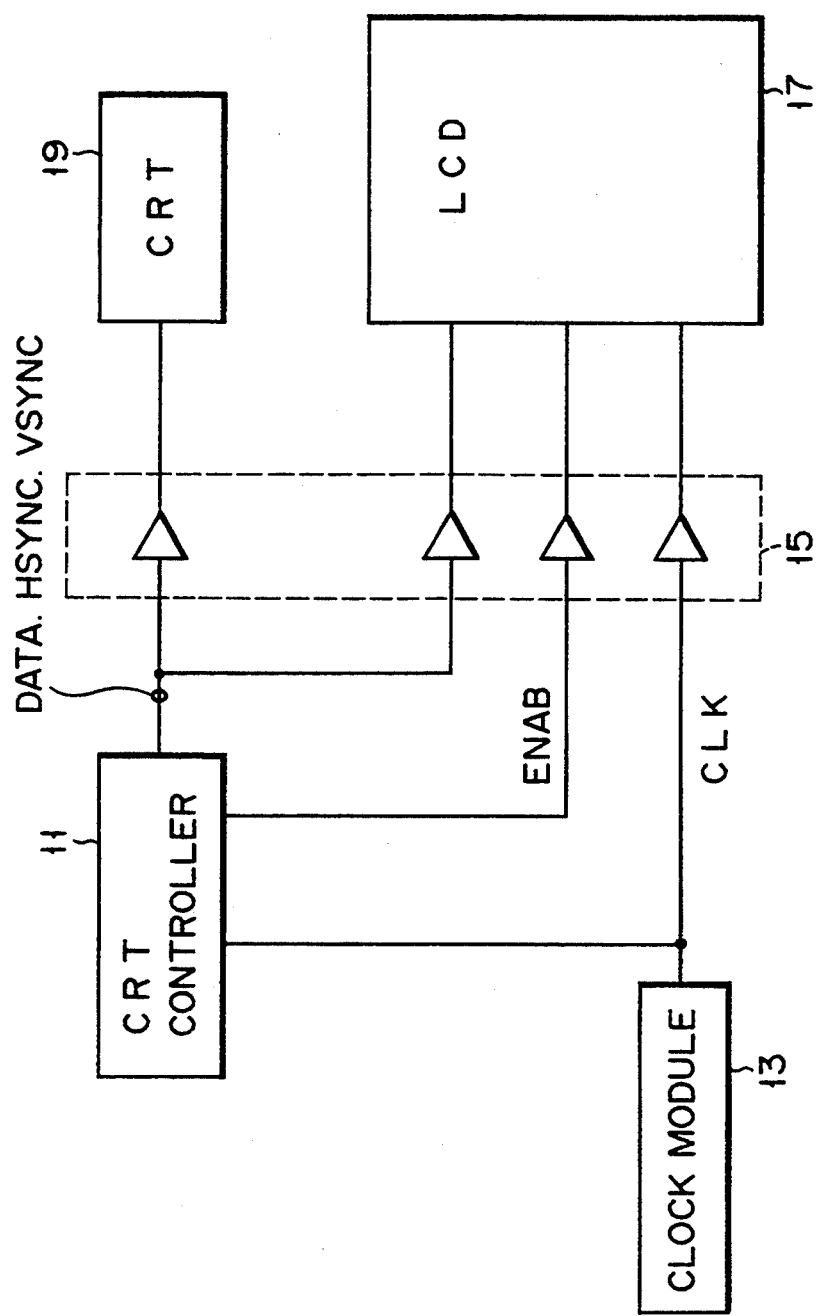
FIG. 5 is a block diagram showing a display control system according to an embodiment of the present invention.

FIG. 5 is a block diagram showing a display control system according to an embodiment of the present invention. Referring to FIG. 5, a CRT controller 11 supplies various types of signals including a data signal DATA, a horizontal sync signal HSYNC, and a vertical sync signal VSYNC to a cathode ray tube (CRT) 19 and a liquid crystal display (LCD) 17 through a driver 15. A clock module 13 supplies a clock signal CLK used as, e.g., a shift clock for a data load operation, to the CRT controller 11 and to the LCD 17 through the driver 15.

In addition, a display period signal ENAB for designating a valid display period of display data DATA is supplied from the CRT controller 11 to the LCD 17 through the driver 15. In this case, the polarities (positive/negative) of the vertical sync signal VSYNC and the horizontal sync signal HSYNC are changed in accordance with display resolutions (three types of resolutions: 640×480 dots; 640×400 dots; and 640×350 dots shown in FIGS. 9A through 9C), as shown in FIG. 10. A method of determining a display resolution on the basis of the polarities of the vertical and horizontal sync signals HSYNC and VSYNC is disclosed in, e.g., U.S. Ser. No. 355,613 (filing date: May 23, 1989; title: "PLASMA DISPLAY CONTROL SYSTEM") filed by the same assignee as that of the present invention.

Figure 6:
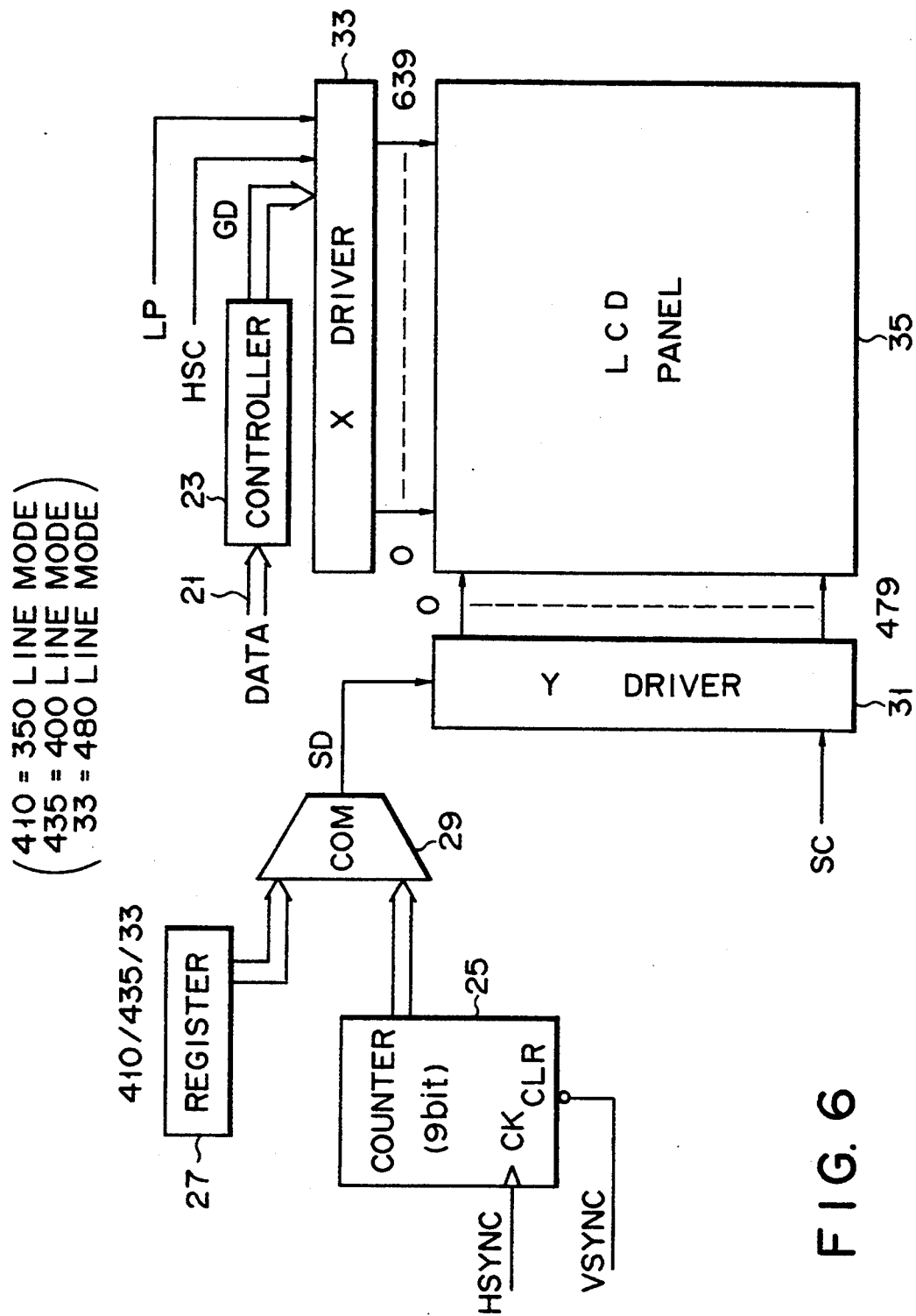
FIG. 6 is a block diagram showing an internal arrangement of the LCD shown in FIG. 5.
Figure 7G:
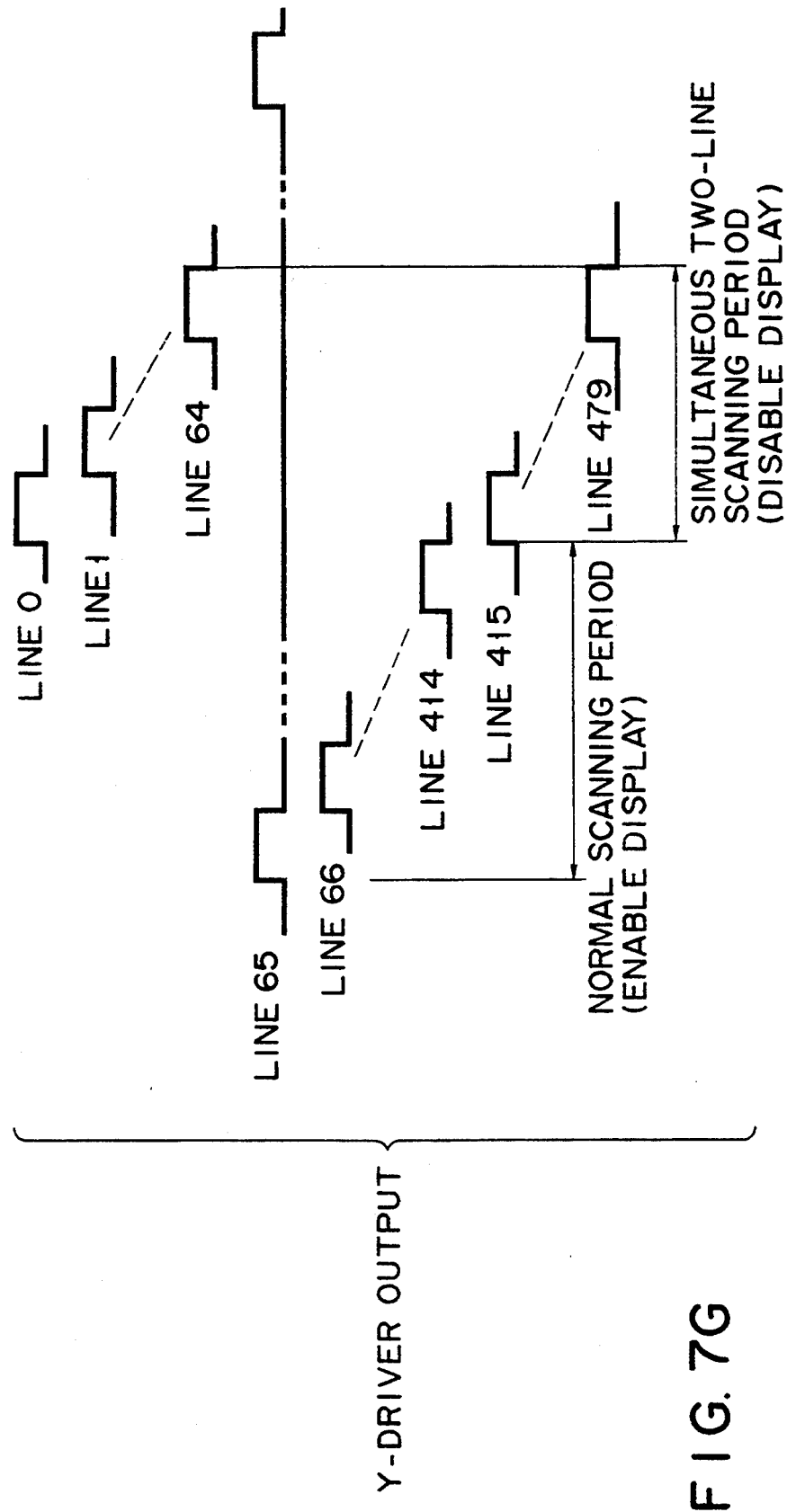

FIG. 6 is a block diagram showing an internal arrangement of the LCD 17.

Referring to FIG. 6, each dot of display data (DATA) 21 consists of 4 bits (16 gradation levels). A controller 23 is constituted by a gate array. The controller 23 continuously receives the display data (DATA) 21 and outputs it as gradation data GD.

A counter 25 is initialized (cleared) by the vertical sync signal VSYNC and is operated by the horizontal sync signal HSYNC to perform a count operation. A register 27 holds a set display mode eigenvalue (in this case, 33 for 480 lines, 435 for 400 lines, and 410 for 350 lines). A comparator (COM) 29 compares the count value of the counter 25 with the display mode eigenvalue held in the register 27. When the count value of the counter 25 reaches the display mode eigenvalue held in the register 27, the comparator 29 outputs a scanning start signal SD to the Y driver 31. The Y driver 31 receives the scanning start signal SD generated by the comparator 29 and a scan pulse SC controlled by the horizontal sync signal HSYNC, and sequentially drives (line scan) Y electrodes (lines 0–479) of an LCD panel 35. An X driver 33 receives the gradation data GD output from the controller 23, the latch pulse LP controlled by the horizontal sync signal HSYNC, a horizontal shift clock HSC controlled by the clock signal CLK from the clock module 13, and the like. The X driver 33 loads the gradation data GD in a shift register arranged therein in response to the clock HSC, latches 640-pixel data in a latch circuit arranged therein in response to the latch pulse LP, and outputs pulses (0–639) for driving X electrodes of the LCD panel 35. The LCD panel 35 has a maximum resolution of 640×480 dots and performs a display of 16 gradation levels. Note that a mode discrimination clock generator for determining a display resolution from the polarities of the horizontal and vertical sync signals HSYNC and VSYNC and generating internal clock signals, and an anode timing generator for outputting the horizontal shift clock HSC and the latch pulse LP on the basis of the clock CLK and an ENAB signal t shown in FIG. 5 and an internal clock from the mode discrimination clock generator are disclosed in detail in, e.g., U.S. Ser. No. 355,615 (filing date: May 23, 1989; title: "PLASMA DISPLAY CONTROL SYSTEM") filed by the same assignee as that of the present invention.

Figure 11:
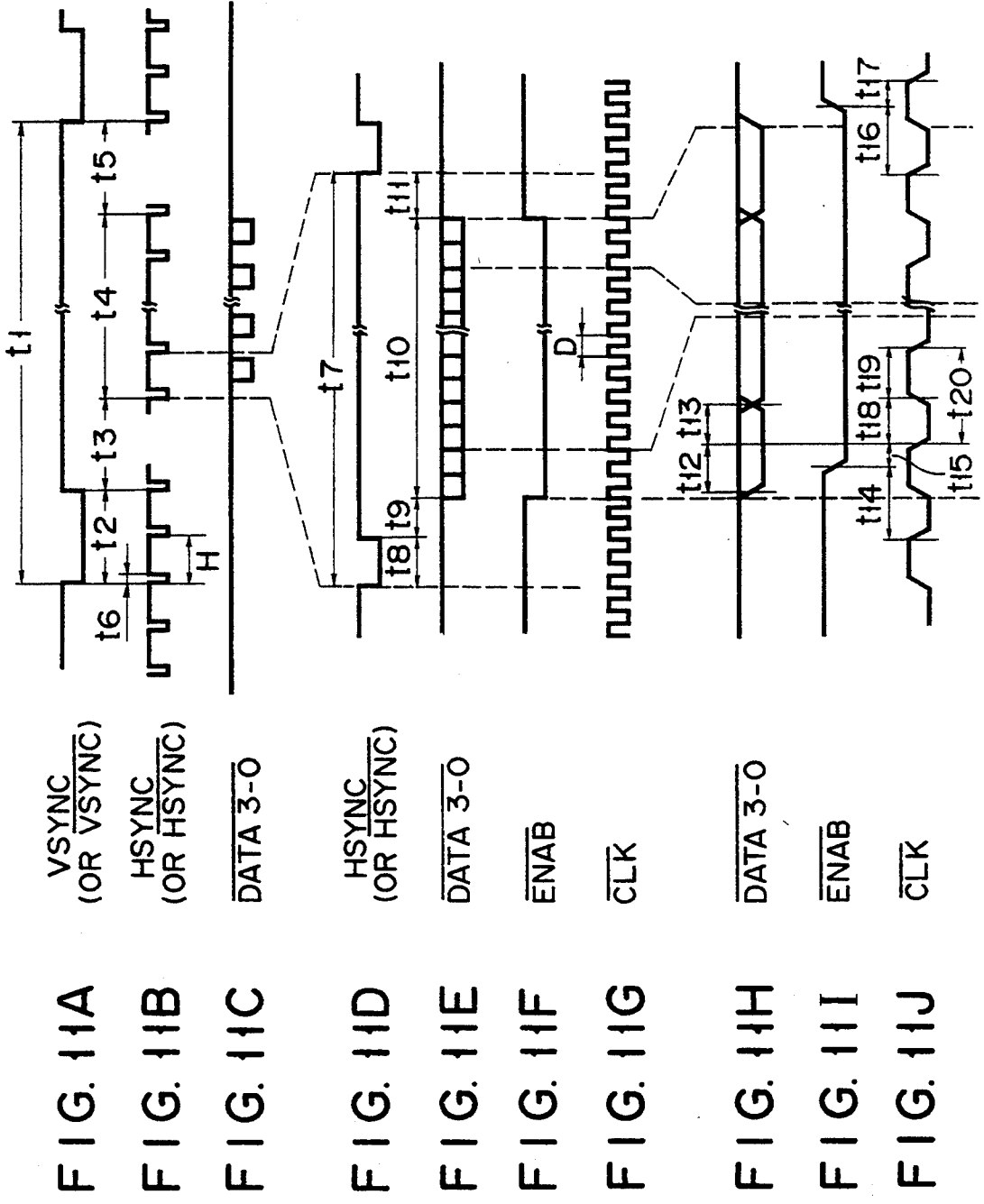
FIGS. 11A through 11J are timing charts of signals t1 through t11 in FIG. 10.

FIG. 7A through 7G are timing charts showing an operation of the embodiment shown in FIG. 6. In this embodiment, the timing charts are associated with a 640×350-dot display mode. In the 640×350-dot display mode, "410" as a display mode eigenvalue is set in the register 27 to simultaneously scan two lines of 0th through 64rd lines and 415th through 479th lines, of the 480 (0th–479th) lines, at a time. When the count value of the counter 25 coincides with the display mode eigenvalue set in the register 27, the scanning start signal SD is generated by the comparator 29 and is supplied to the Y driver 31. Note that the counter 25 is cleared by the vertical sync signal VSYNC shown in FIG. 7A and is controlled to be updated (+1) by the horizontal sync signal HSYNC shown in FIG. 7B. The display mode eigenvalue (410) set in the register 27 is obtained on the basis of the sum of the number of lines (350 lines) corresponding to the designated display mode (640×350) dots and a vertical back porch (t3=59H shown in FIGS. 10, 11A, and 11B) which follows the vertical sync signal VSYNC in the designated display mode.

Figure 8A:
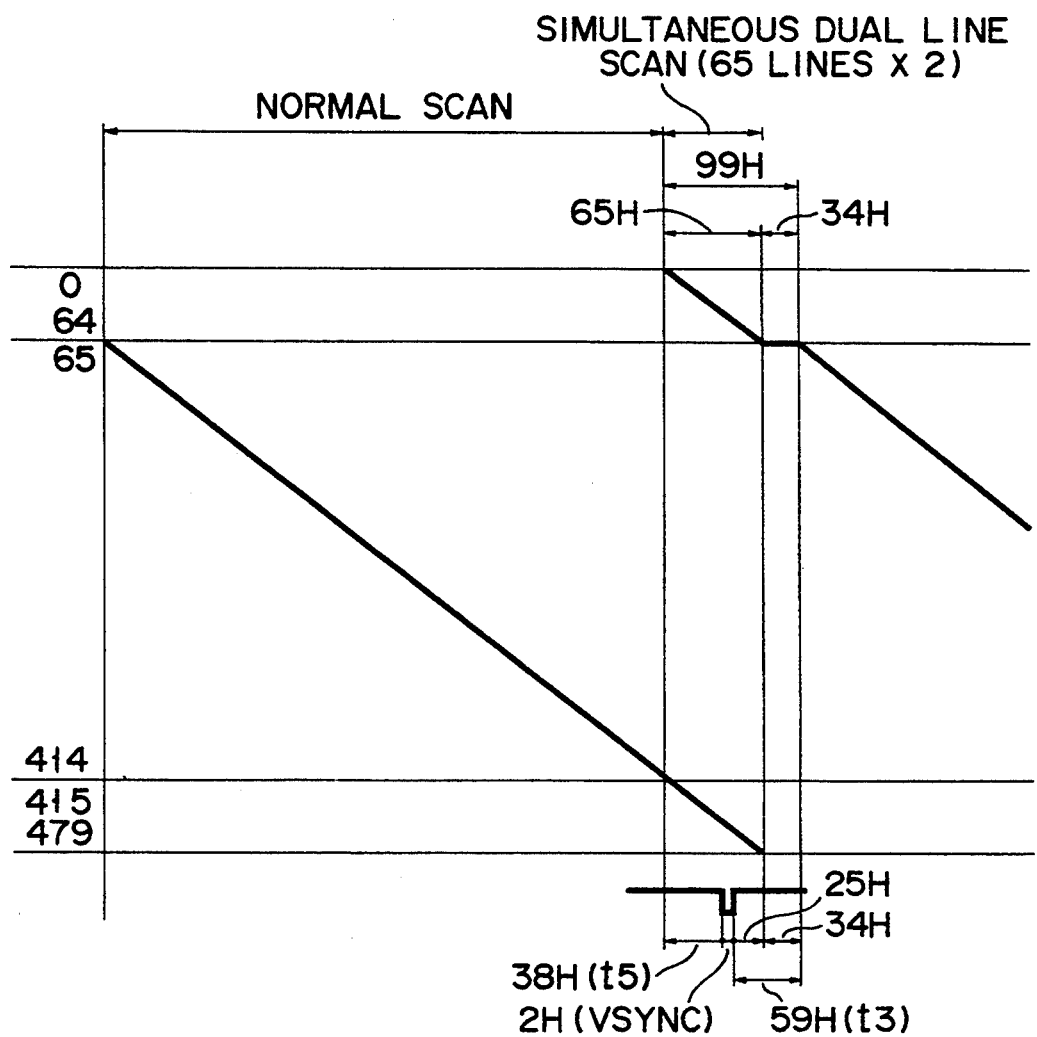
Figure 8B:
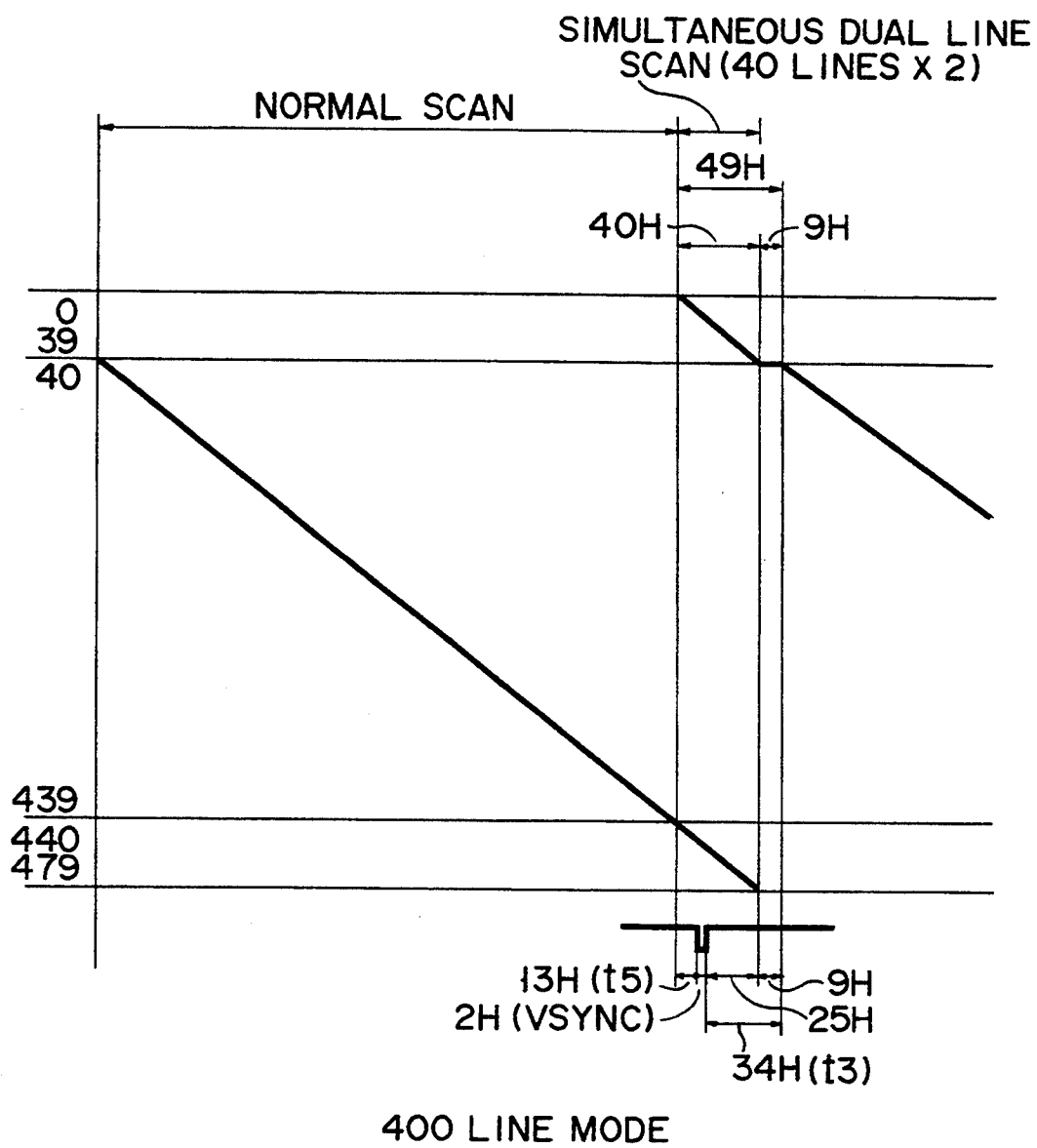
Figure 8C:
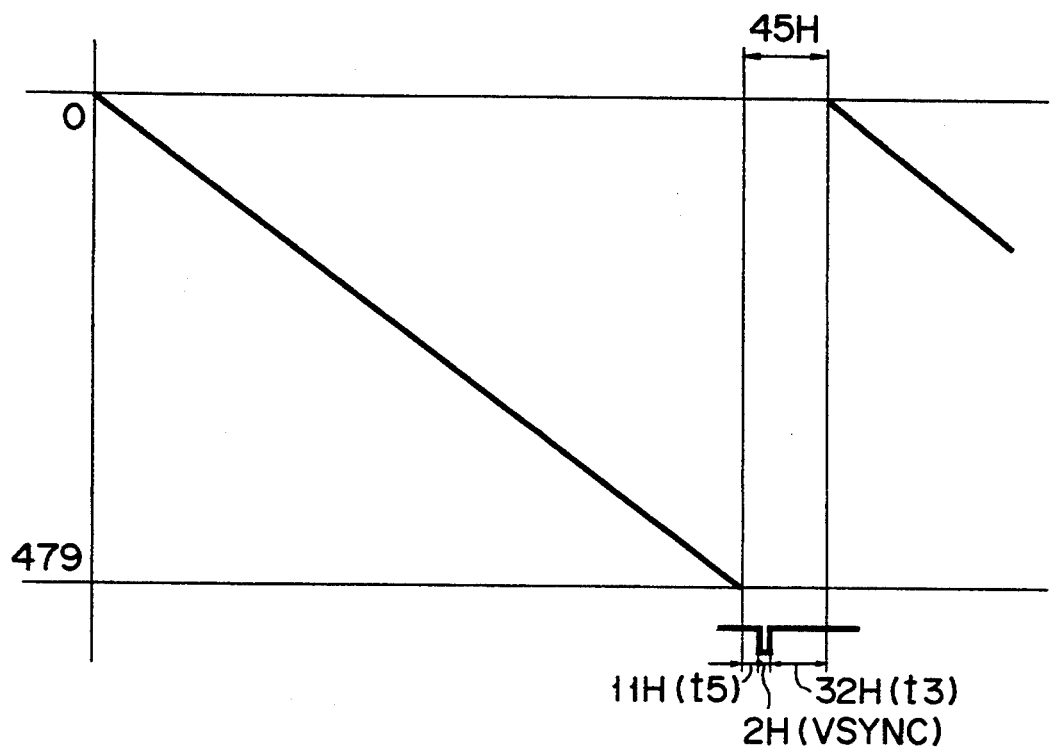

FIGS. 8A through 8C are views showing line scan operations developed on the time axis with the respective display resolutions. FIG. 8A shows a 640×350-dot (=350-line) scan. FIG. 8B shows a 640×400-dot (=400-line) scan. FIG. 8C shows a 640×480-dot (=480-line) scan. As shown in FIG. 8A, in the 350-line mode, display lines in upper and lower display screen regions, each having 65 lines, are scanned in twos at a time (e.g., line 0 and line 415, and line 1 and line 416). As shown in FIG. 8B, in the 400-line mode, display lines in upper and lower display screen regions, each having 40 lines, are scanned in twos at a time.

As shown in FIG. 8A, at the display timing of the CRT display with a display resolution of 640×350 dots, a display operation of a valid display region is started after the vertical sync signal VSYNC is output and a vertical back porch (t3) period is over, i.e., after a 59H period. That is, when a period of 59H+350 lines (H) elapses, the display of the valid display region is completed. Therefore, in each display resolution mode, if the sum of a vertical back porch period (t3) and the total number of horizontal display lines is counted by the counter 25, and the scanning data signal SD is supplied from the comparator 29 to the Y driver 31 to start scanning of line 0 when a period corresponding of the sum elapses, non-display regions formed in upper and lower portions on the physical screen can be simultaneously scanned. More specifically, in the 640×350-dot display resolution shown in FIG. 8A, "410" is set in the register 27. "410" is larger than the sum of a vertical back porch period (t3) and the total number of horizontal lines (350) in the vertical direction by one. This difference is made in consideration of a timing and corresponds to a clock for the first line data of the line data shown in FIG. 7C. For this reason, "410" is actually set in the register 27.

FIG. 8B shows a vertical back porch period (t3) and a horizontal valid display line count in the vertical direction in the 640×400-dot display resolution. In this case, simultaneous scanning of the 0th and 440th lines is started after the lapse of a period of "435" obtained by adding "1" to the sum of a vertical back porch period (34 (H)) and a valid display line count (400 (H)).

FIG. 8C shows a case of a display resolution of 640×480 dots, in which no upper and lower non-display regions are formed. Therefore, as is apparent from FIG. 8C, a display operation of a valid display region is performed after a vertical sync signal is output and a period of "32 (H)" is over. In this case, "33 (H)", a value obtained by adding "1" to "32 (H)", is set in the register 27.

Figure 9A:
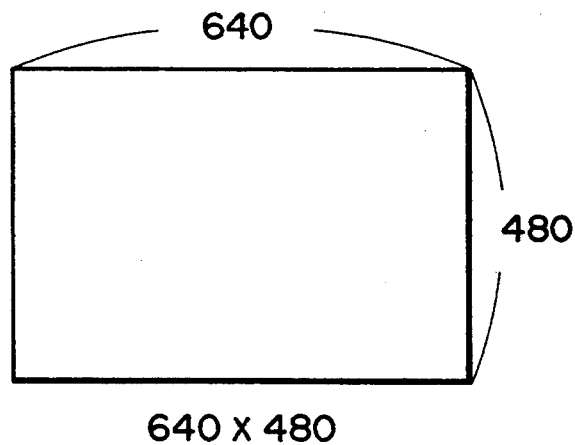
Figure 9B:
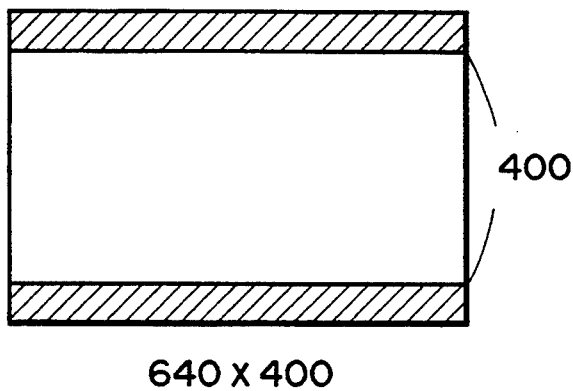
Figure 9C:
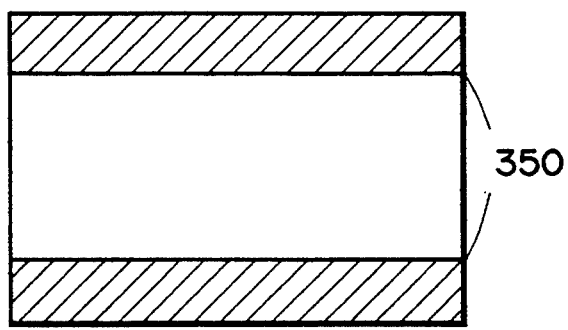

FIGS. 9A through 9C respectively show display and non-display regions with different display resolutions. FIG. 9A shows display and non-display regions in the 640×480-dot (480-line) display mode. Similarly, FIGS. 9B and 9C respectively show display and non-display regions in the 640×400-dot (400-line) mode and the 640×350-dot (350-line) mode. Referring to FIGS. 9B and 9C, each hatched portion in upper and lower portions of the screen indicates a non-display region.

FIG. 10 show the set duration of each signal in the three types of display modes, i.e., the 640×480-dot, 640×400-dot, and 640×350-dot display modes. FIGS. 11A through 11H are timing charts of the respective signals shown in FIG. 10.

Referring to FIGS. 10 and 11A through 11H, reference symbol t1 denotes a one-frame period; t2, a vertical sync (VSYNC) period; t3, a vertical back porch; t4, a vertical display period; t5, a vertical front porch; t6, a time interval between the instant at which the vertical sync signal VSYNC is set at low level and the instant at which the horizontal sync signal HSYNC is set at high level; t7, one horizontal period; t8, a horizontal sync (HSYNC) period; t9, a horizontal back porch; t10, a one-line display period; t11, a horizontal front porch; t12, a data setup time; t13, a data hold time; t14, an enable hold time (from high level to low level); t15, an enable setup time (from high level to low level); t16, an enable hold time (from low level to high level); t17, an enable setup time (from low level to high level); t18, a clock low time; t19, a clock high time; and t20, a clock period. Note that "H" and "D" in brackets in FIG. 10 respectively indicate the HSYNC period and the CLOCK period in FIGS. 11B and 11G.

An operation of the display control system having the above-described arrangement according to an embodiment of the present invention will be described below with reference to FIGS. 5 through 11J.

The CRT controller 11 generates the vertical sync signal VSYNC, the horizontal sync signal HSYNC, the display data DATA, the enable signal ENAB, and the like at the display timing of the CRT display 19. These signals are supplied to the LCD 17 and the CRT display 19 through the driver 15. In addition, the clock signal CLK is supplied from the clock module 13 to the LCD 17 through the driver 15.

The LCD 17 drives/controls the LCD panel 35 in accordance with the supplied signals, i.e., the signals VSYNC, HSYNC, and DATA.

The display data DATA, each pixel of which consists of 4 bits (16-gradation level display), is supplied, as the gradation data GD, to the X driver 33 through the controller 23.

The X driver 33 receives the gradation data GD, the horizontal shift clock HSC, and the latch pulse LP from the controller 23. In response to the horizontal shift clock HSC, the X driver 33 latches 640-pixel data of the gradation data GD, and outputs pulses (0–639) corresponding to the pixel data to the LCD panel 35.

Upon reception of the scanning start signal SD generated by the comparator 24 and the scan pulse SC controlled by the horizontal sync signal HSYNC, the Y driver 31 sequentially drives (line scan) the Y electrodes (lines 0–479) of the LCD panel 35. Every time the Y driver 31 receives the scanning start signal SD generated by the comparator 29, the Y driver 31 executes a line scan (0–479) corresponding to one frame of the LCD panel 35 in response to the scan pulse SC. The Y driver 31 is constituted by a shift register, and a scan pulse as a clock signal is commonly supplied to each flip-flop. If a designated display resolution is lower than the resolution of the LCD panel 35, the scanning start signal SD is output before scanning of all the lines (0–479) of the LCD panel 35 is completed, thus executing a simultaneous dual line scan with respect to upper and lower non-display portions of the LCD panel 35, as shown in FIGS. 8A and 8B. Non-display regions are then formed in upper and lower portions of the display screen, as indicated by hatched lines in FIGS. 9B and 9C. As a result, a valid display region corresponding to the designated number of dots is formed in the middle of the screen of the LCD panel 35.

An operation to be performed when a display resolution of 640×350 dots is designated will be described below with reference to the timing charts shown in FIGS. 7A through 7G.

In the 640×350-dot mode, the number of scanning lines is 350, and a vertical back porch (t3) is 59H (corresponding to 59 lines). In this mode, a valid display period corresponding to 350 lines is started after the vertical sync signal VSYNC is output and a period of 59H elapses, as shown in FIG. 8A. Therefore, "410", a value obtained by adding the valid display period and the vertical porch period, is set in the register 27. Although "509" is obtained if the valid display period (350 lines) and the vertical back porch period (59H) are simply added together, since a value corresponding to the first line data of the line data shown in FIG. 7C is added in consideration of a timing, "410" is actually set in the register 27.

The counter 25 is cleared by the vertical sync signal VSYNC having a width of 2H and is sequentially updated (+1) by the horizontal sync signal HSYNC.

When the counter 25 counts 59H corresponding to the vertical back porch, all the gradation data GD of 640 pixels corresponding to the first line are loaded in the shift register arranged in the X driver 33. At the timing of the next one horizontal period (1H), pulses (0–639) for driving the X electrodes corresponding to the gradation data GD are output from the X driver 33 to the LCD panel 35.

Meanwhile, upon reception of each scanning start signal SD generated by the comparator 29, the Y driver 31 executes scanning of lines (0–479) corresponding to one frame of the LCD panel 35 in response to the scan pulse SC.

The designated display resolution (640×350 dots) is lower than the resolution (640×480 dots) of the LCD panel 35. For this reason, when line scanning of the LCD panel 35 is performed and the count value of the counter 25 becomes "410", the count value coincides with the display mode eigenvalue "410" set in the register 27. As a result, the scanning start signal SD is supplied from the comparator 29 to the Y driver 31. When the pulses (0–639) for driving the x electrodes corresponding to the gradation data GD of 640 pixels of the first line are output from the X driver 33 to the LCD panel 35, the Y driver 31 has already scanned the 0th through 64th lines upon generation of the scanning start signal SD. Therefore, a valid display based on display data 11 is started from the 65th line, and the gradation data GD of 640 pixels of the first line is displayed on the 65th line.

As described above, when the display resolution of a designated display mode is lower than the resolution of the LCD panel 35, the scanning start signal SD is output before scanning of all the lines (0–479) of the LCD panel 35 is completed, and a simultaneous scan of upper and lower non-display portions of the LCD panel 35 is performed, as shown in FIG. 8A. As a result, a 16-gradation level valid data display corresponding to the number of lines (350) of the designated display mode (640×350 dots) is performed in the center of the screen of the LCD panel 35, as indicated by the hatched lines in FIG. 9C, thereby forming upper and lower non-display regions, each corresponding to 65 lines, by means of invalid data display.

In the 640×400-dot display mode, "435" is set in the register 27, which is obtained by adding a value corresponding to one line of the first display data to the sum of the number of display lines (400) and a vertical back porch period (34 (H)) in consideration of a timing. Subsequent operations are performed in the same manner as in the 640×350-dot display mode. Furthermore, in the 640×480-dot display mode, no upper and lower non-display regions are formed. Therefore, a value obtained by adding a value corresponding to one line of the first display data to a vertical back porch period (32 (H)) is set in the register 27. Subsequent operations are performed in the same manner as in the 640×350-dot display mode.

As described above, according to this embodiment, the CRT display 19 and the LCD 17 can be simultaneously driven with a simple, economical arrangement using the single CRT controller. In addition, each of a plurality of types of display modes (640×350-dot and 640×400-dot modes in this case), in which a total horizontal line count in the vertical direction (vertical non-display period + horizontal non-display period) is smaller than a physical display dot count in the vertical direction on the LCD 17, can be supported. Furthermore, since display software (e.g., BIOS or application software) designed for a CRT display can be used for the LCD 17 without any modifications, software can be effectively used, thus providing economical advantages.

In the above-described embodiment, the circuit for generating the scanning start signal SD corresponding to the timing unique to a designated display mode is realized by the circuit elements such as the counter 25, the register 27, and the comparator 29, and is arranged in the LCD unit. However, the present invention is not limited to this, but another hardware arrangement or an arrangement using the CPU function of the apparatus main body may be employed. In the embodiment described above, a display operation of 16 gradation levels is exemplified. However, the present invention is not limited to this but may be applied to other display operations of gradation levels different from 16 gradation levels or to color display panels.

Figure 12:
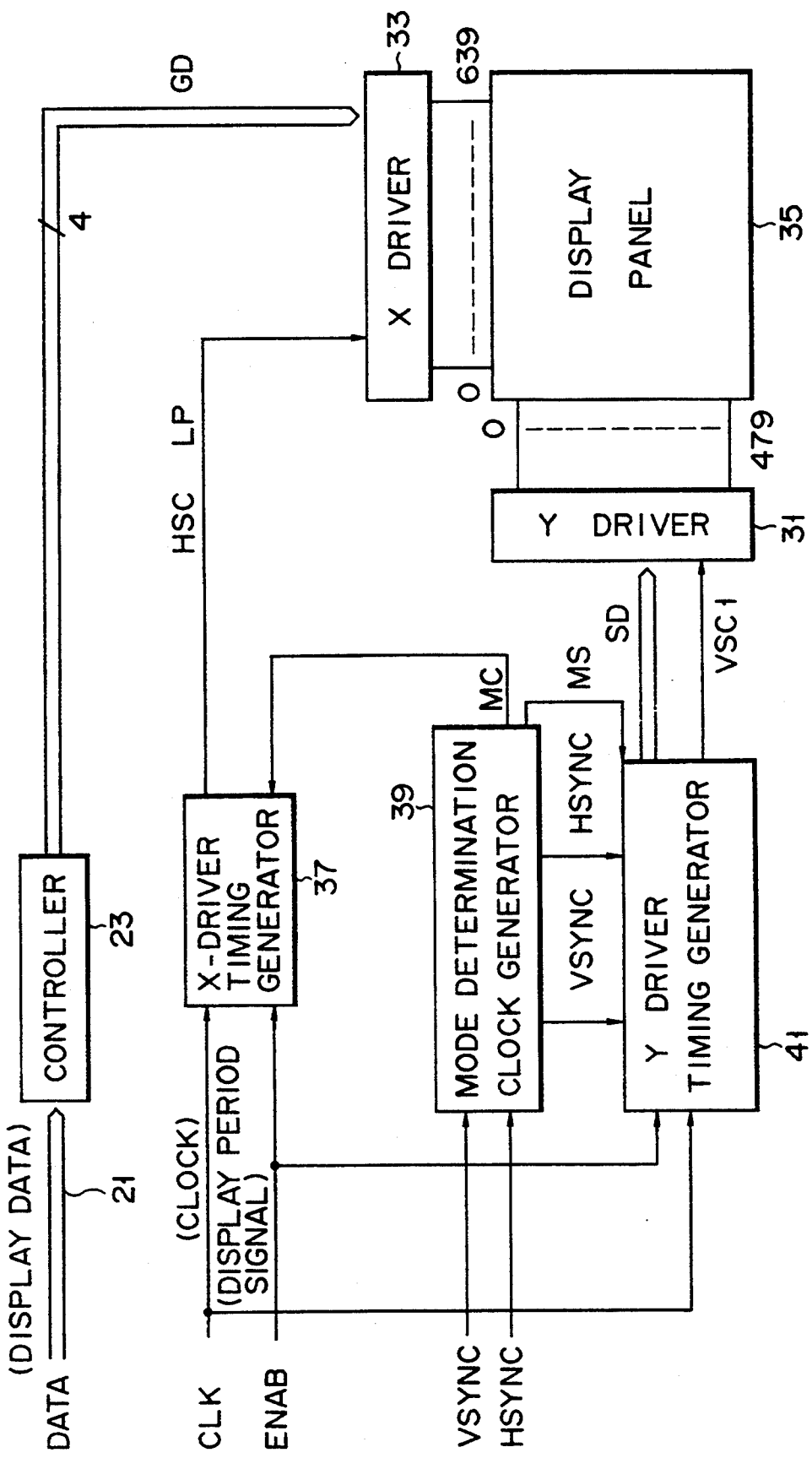
FIG. 12 is a block diagram showing an internal arrangement of an LCD according to another embodiment of the present invention.

FIG. 12 is a block diagram showing an internal arrangement of the LCD 17 according to another embodiment of the present invention. Note that the same reference numerals in FIG. 12 denote the same parts as in FIG. 6. Referring to FIG. 12, one dot of display data (DATA) 21 consists of 4 bits (16 gradation levels). A controller 23 continuously receives this display data (DATA) 21 and output it as gradation data GD.

An X-driver timing generator 37 receives a clock CLK and a display period signal ENAB together with a clock MC output from a mode determination clock generator 39, and generates and outputs a horizontal shift clock HSC, a latch pulse LP, and the like. The mode determination clock generator 39 determines the display resolution of a display screen (FIGS. 9A through 9C) from the positive/negative polarities of vertical and horizontal sync signals. On the basis of the determination result, the generator 39 then outputs 2-bit mode switching signals MS and generates various types of internal clocks MC. In a 640×480-dot display mode, the mode determination clock generator 39 outputs mode switching signals MS0 and MS1 both of which are set at logic "0". Similarly, in a 640×400-dot display mode, the generator 39 outputs the mode switching signals MS0 and MS1 which are respectively set at logic "1" and logic "0". In a 640×350-dot display mode, the generator 39 outputs the signals MS0 and MS1 which are respectively set at logic "0" and logic "1".

A Y-driver timing generator 41 receives the display period signal ENAB, the clock CLK, vertical and horizontal sync signals output from the mode determination clock generator 39, 2-bit mode switching signals MS, and the like, and generates scanning data SD, a vertical shift clock VSC1, and the like for driving Y electrodes.

Upon reception of the scanning data SD and the vertical shift clock VSC1 generated by the Y-driver timing circuit 41, a Y driver 31 outputs pulses (0–479) for driving Y electrodes.

An X driver 33 receives the gradation data GD output from the controller 23, and the horizontal shift clock HSC and the latch pulse LP output from the X-driver timing generator 37. In response to the clock HSC, the X driver 33 reads the gradation data GD in a shift register arranged therein. In response to the latch pulse LP, the X driver 33 latches 640-pixel data in a latch circuit arranged therein, and outputs pulses (0–639) for driving X electrodes.

A display panel (liquid crystal panel) 35 has a maximum display resolution of 640–480 dots and displays data with 16 gradation levels.

FIGS. 11A through 11J show timing charts of the respective signals supplied to the respective components of the LCD shown in FIG. 12.

Figure 13:
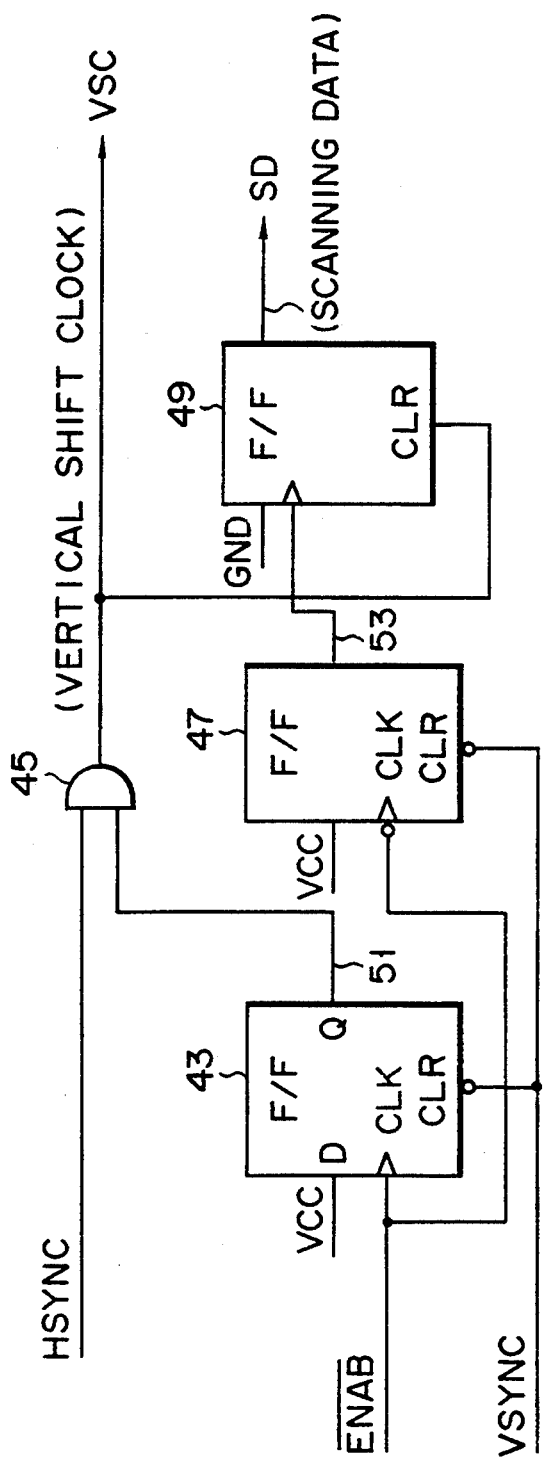
FIG. 13 is a block diagram showing an internal arrangement of a Y-driver timing generator in FIG. 12.
Figure 14:
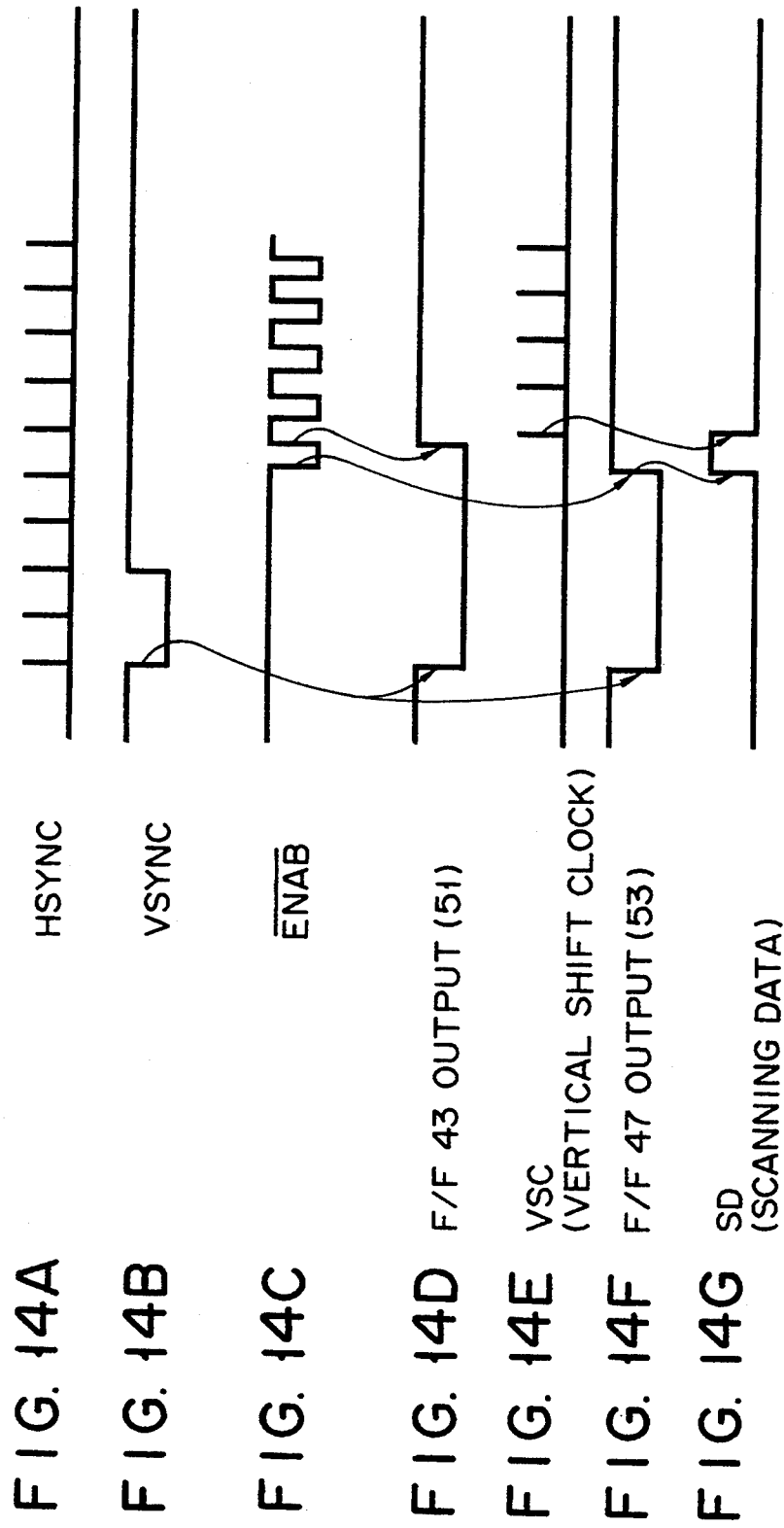
Figure 16:
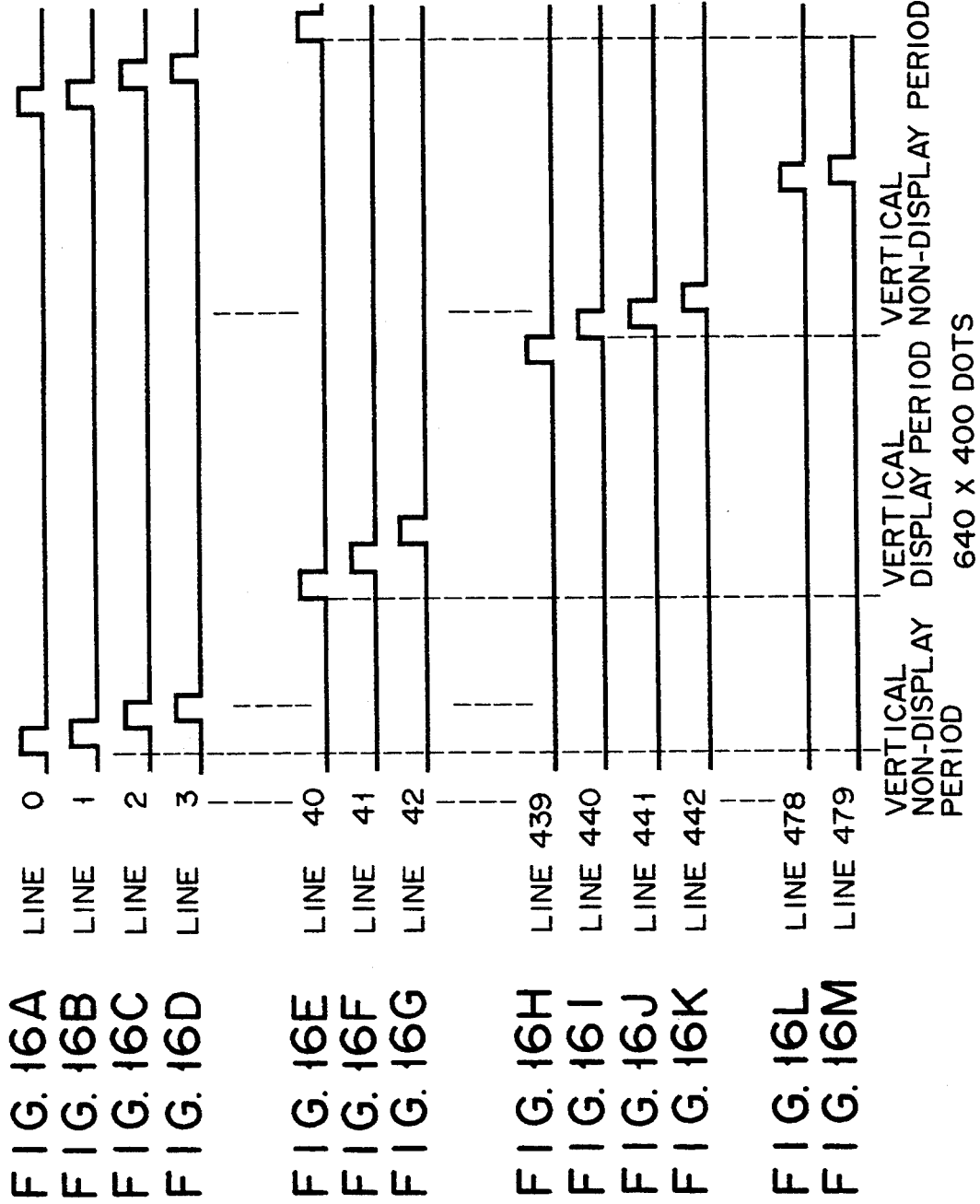
FIGS. 16A through 16M are timing charts showing a vertical display period and a non-display period in a 640×400-dot display operation.
Figure 17:
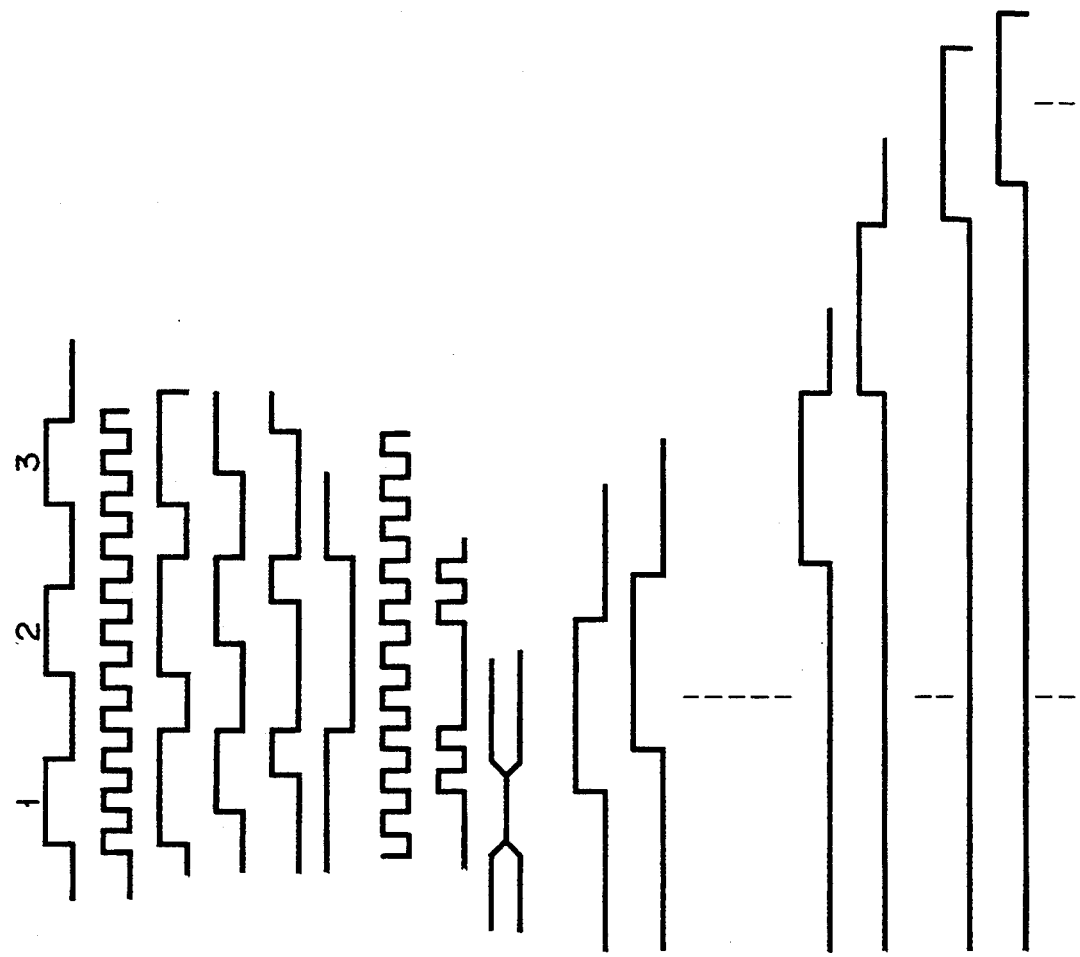
FIGS. 17A through 17O and FIGS. 18A through 18H are timing charts of signals in the respective components in FIG. 15.

FIG. 13 is a block diagram showing an internal circuit arrangement of the Y-driver timing generator 14.

Referring to FIG. 13, a flip-flop (F/F) 43 generates a generation timing signal 51 of the vertical shift clock VSC on the basis of the vertical sync signal VSYNC and the display period signal ENAB. An AND gate 45 generates the vertical shift clock VSC on the basis of the timing signal 51 and the horizontal sync signal HSYNC. A flip-flop (F/F) 47 generates a generation timing signal 53 of the scanning data SD on the basis of the vertical sync signal VSYNC and the display period signal ENAB. A flip-flop (F/F) 49 generates the scanning data SD on the basis of the timing signal 53 generated by the F/F 47 and the vertical shift clock VSC generated by the AND gate 45. Note that since the X-driver timing generator 37 has the same circuit arrangement as that of the Y-driver timing generator 41, a description thereof will be omitted.

FIGS. 14A through 14G are timing charts showing signal timings at the respective components shown in FIG. 13.

FIG. 15 shows an arrangement of a vertical shift clock (VSC1) generator, arranged in the Y-driver timing generator 41, including a circuit which is enabled, when data is to be displayed on the LCD with a resolution lower than the vertical resolution of the LCD, so as to perform a line scan a plurality of times in regions (non-display regions) other than a valid display region during a period corresponding to a one-line scan of the valid display region. Referring to FIG. 15, a decoder 55 discriminates a display mode (i.e., one of the three types of display resolutions: 640×480 dots, 640×400 dots, and 640×350 dots) in accordance with the 2-bit mode switching signals MS0 and MS1 output from the mode determination clock generator 39.

When the 640×400-dot display mode is discriminated by the decoder 55, a binary sync up counter 57 is enabled to perform a count operation in accordance with the vertical shift clock VSC. As an initial value, "20" is set in the counter 57. When the counter 57 counts "20", it outputs a count end signal to the F/F 59. A binary sync up counter 61 has the same arrangement as that of the counter 57. The counter 61 is enabled upon discrimination of the 640×350-to display mode by the decoder 55, and performs a count operation in accordance with the vertical shift clock VSC. As an initial value, "33" is set in the counter 61. The counter 61 outputs a count end signal to the F/F 63.

The F/Fs 59 and 63 respectively hold output signals from the counters 57 and 61 at high level. When one of the F/Fs 59 and 63 is set at high level, an OR gate 65 outputs a gate open control signal 103. Binary sync up counters 67 and 69 have the same arrangement as that of the counters 57 and 61. The counters 67 and 69 are respectively enabled by high-level outputs (Q=1) from the corresponding F/Fs 59 and 63, thus performing count operations in accordance with the vertical shift clock VSC. As initial values, "400" and "350" are respectively set in the counters 67 and 69.

An AND gate 71 controls an output operation of the vertical shift clock (VSC) generated by the circuit shown in FIG. 13 in accordance with the output signal 101.

Each of F/Fs 73, 75, 77, and 79 is used to shift/output the horizontal sync signal HSYNC in synchronism with the clock CLK. An AND gate 81 serves to calculate the AND product of an output Q from the F/F 75 and an inverted signal of the clock CLK. A circuit, enclosed with a dotted line, which includes the F/Fs 73, 75, 77, and 79 and the AND gate 81 generates pseudo vertical shift clocks for performing a line scan twice (double select) in invalid display regions during a period corresponding to one-line scan in a valid display region.

An AND gate 83 selectively disables outputs from the AND gate 81 in accordance with outputs from OR gate 65. An OR gate 85 calculates the OR product of outputs from the AND gates 71 and 83.

An AND gate 87 calculates the AND product of an inverted output from the binary sync up counter 67 and an inverted output of the vertical sync signal VSYNC, and disables the binary sync up counter 57 and the F/F 59 during a count operation of the binary sync up counter 67 (during a 400-line scan period in a valid display region). An AND gate 89 calculates the AND product of an inverted output from the binary sync up counter 69 and an inverted output of the vertical sync signal VSYNC, and disables the binary sync up counter 61 and the F/F 63 during a count operation of the binary sync up counter 69 (during a 350-line scan period in a valid display region).

FIGS. 16A through 16M are timing charts showing line scan timings during vertical display and non-display periods in the 640×400-dot display mode. As shown in FIGS. 16A through 16M, in the 640×400-dot display mode, line 0 through line 39 and line 440 through line 479 correspond to a non-display period, whereas line 40 through line 439 correspond to a display period.

Figure 18:
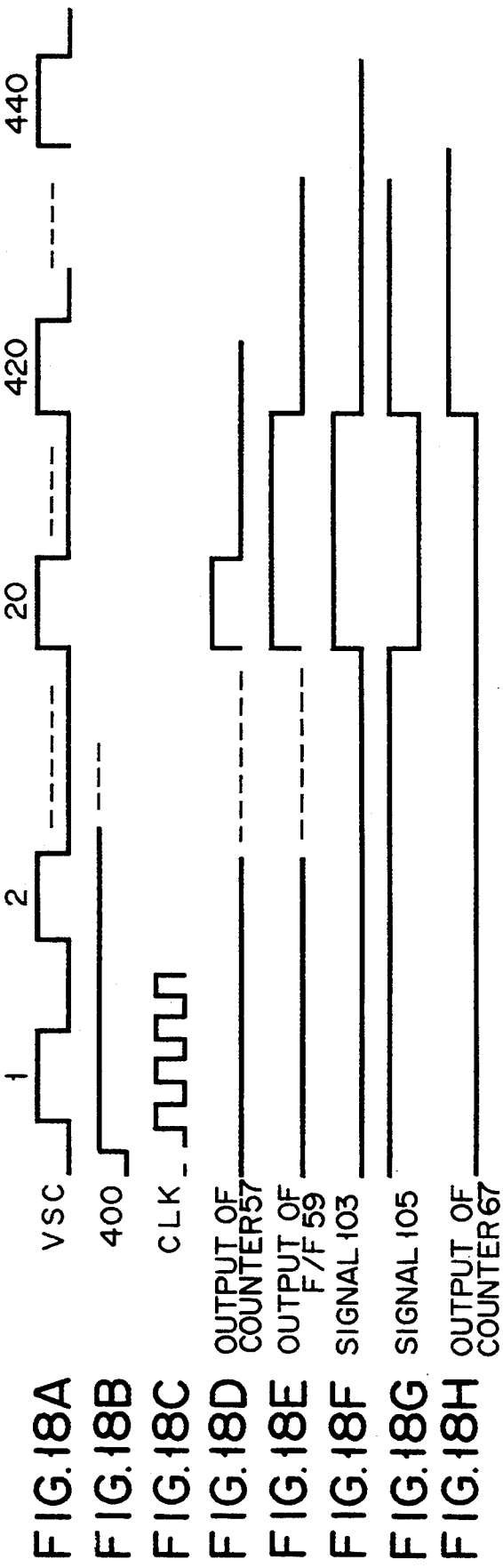

FIGS. 17A through 17O and FIGS. 18A through 18H are timing charts showing signal timings and line scan timing at the respective components shown in FIG. 15. Note that FIG. 18B shows a signal output from the decoder 55 and representing a display resolution of 640×400 dots.

Figure 19:
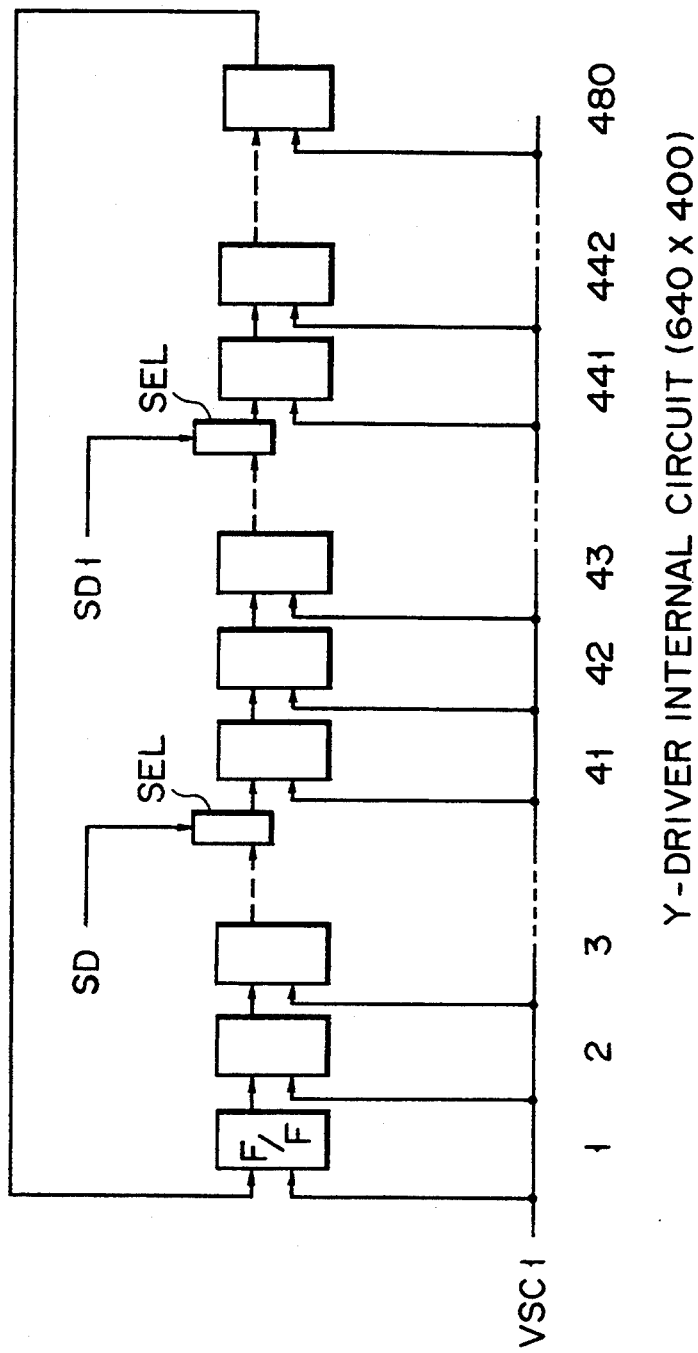
FIG. 19 is a block diagram showing an internal circuit arrangement of the Y driver in FIG. 12.

FIG. 19 is a block diagram showing an internal arrangement of the Y driver 31. As shown in FIG. 19, a shift register is constituted by a plurality of flip-flops (F/Fs). In addition, the Y driver 31 includes gates (selectors) for inputting scanning data SD and SD1 to the shift register. In this embodiment, the shift register is constituted by 480 F/Fs. When a display resolution of 640×400 dots is set, the scanning data SD is used as an input signal to the 41st F/F, and the scanning data SD1 is used as an input signal to the 441st F/F, as shown in FIG. 19.

Although not shown, when a display resolution of 640×350 dots is set, only the input positions of the scanning data SD and SD1 input in the shift register are changed.

FIG. 20 shows an arrangement of a circuit for generating the scanning data SD1 by using the scanning data SD and the vertical shift clock VSC1 output from the OR gate 46.

As shown in FIG. 20, when a display resolution of 640×400 dots is set, count value "400" is set in a counter 91. The vertical clock signal VSC1 is supplied to the counter 91 and the clock input terminal of each of F/Fs 93 and 95. In response to the scanning data signal SD, the counter 91 counts "400" and supplies an output to the F/F 93 and an AND gate 97. As shown in FIGS. 21F and 21G, the output from the counter 91 is output to the AND gate 97 through the two F/Fs 93 and 95 such that the scanning data signal SD1 enabled by the first vertical shift clock signal VSC1 and is disabled by the third clock VSC1.

FIGS. 21A through 21P are timing charts respectively showing line scan timings in the 640×400-dot display mode in consideration of the timings of the scanning data SD and the vertical shift clock VSC1.

An operation of the display control system having the above-described arrangement according to another embodiment of the present invention will be described below with reference to FIGS. 12 through 21P.

The CRT controller 11 generates the vertical sync signal VSYNC, the horizontal sync signal HSYNC, the display data DATA, and the like at the display timings of the CRT display 19. These signals are supplied to the CRT display 19 through the driver 15. At this time, the polarities of the vertical sync signal VSYNC and the horizontal sync signal HSYNC are changed in accordance with a display resolution, as shown in FIG. 10.

In addition, the display period signal ENAB for designating the valid display period of the display data DATA is supplied from the CRT controller to the LCD 17 through the driver 15. Furthermore, the clock signal CLK is supplied from the clock module 13 to the LCD 17 through the driver 15.

The LCD 17 drives/controls the LCD panel 35 in accordance with the supplied signals VSYNC, HSYNC, DATA, and ENAB.

The display data DATA, each pixel of which consists of 4 bits (16-gradation level display), is supplied, as the gradation data GD, to the X driver 33 through the controller 23.

The X-driver timing generator 37 receives the clock CLK, the display period signal ENAB, and the clock MC from the mode determination clock generator 39, generates the horizontal shift clock HSC, the latch pulse LP, and the like, and outputs them to the X driver 33.

The mode determination clock generator 39 determines the display resolution (FIGS. 9A through 9C) of the display screen on the basis of the positive/negative polarities of the vertical sync signal VSYNC and the horizontal sync signal HSYNC (see FIG. 10). The generator 39 then outputs the mode switching signals MS. At the same time, the generator 39 generates various types of internal clocks MC, and outputs the vertical sync signal VSYNC and the horizontal sync signal HSYNC together with the display resolution determination result.

The Y-driver timing generator 41 receives the vertical sync signal VSYNC, the horizontal sync signal HSYNC, the mode switching signals MS, the clock CLK, and the display period signal ENAB output from the mode determination clock generator 39. The generator 41 then generates signals, such as the scanning data SD and the vertical sync signal VSYNC, for driving the electrodes of the display panel 35, and supplies them to the Y driver 31.

Upon reception of the scanning data SD, the vertical shift clock VSC1, and the like output from the Y-driver timing generator 41, the Y driver 31 outputs pulses (0–479) for driving the Y electrodes.

The X driver 33 receives the gradation data GD, the horizontal shift clock HSC, and the latch pulse LP from the controller 23. In response to the horizontal shift clock HSC, the X driver 33 loads the gradation data GD in the shifter register arranged therein. In response to the latch pulse LP, the X driver 33 latches 640-pixel data and outputs pulses (0–639).

In response to the pulses output from the X driver 33, the display panel 35 outputs display data with a maximum display resolution of 640×480 dots/16 gradation levels. FIGS. 11A through 11J are timing charts showing the timing of each signal supplied to the LCD. As shown in FIG. 10, the set duration of each signal varies depending on the display resolutions described above.

FIG. 15 shows a circuit for generating the vertical shift clock VSC1 for performing double selection of non-display regions so as not to suppress the operation timing in a display region. This circuit is effective when the display resolution of a frame displayed on the LCD 17 is lower than the maximum physical resolution of the LCD 17. A case will be described below, in which a frame displayed on the LCD 17 has a display resolution of 640×400 dots. Note that the circuit is included in the Y-driver timing generator 41.

When a display resolution of 640×400 dots is set, the mode switching signals MS0 and MS1 are respectively set at logic "1" and logic "0" and are input to the decoder 55, thus selecting a signal representing the 640×400-dot display mode. Note that a signal representing the 640×480-dot display mode output from the decoder 55 is a signal NC (no connection), i.e., a signal which is connected nowhere. Since the signal representing the 640×400-dot display mode is supplied, as a start signal, to the binary sync up counter (initial value="20"), the counter 57 is activated. As a result, the vertical shift clock VSC acts as a clock to the binary sync up counter 57, and the counter 57 counts up to "20".

In the 640×400-dot display mode, 40 non-display lines are formed on each of upper and lower portions of the physical screen of 640×480 dots. The reason why "20" is set in the counter 57 is that the frequency of the vertical shift clock VSC is ½ that of a signal from the AND gate 81 (a double select operation of non-display regions is performed in this embodiment). Since the AND gate 83 is kept active until the first counter 57 counts "20", a signal from the AND gate 81 is output as the vertical shift clock VSC1. When the counter 57 counts "20", an output from the counter 57 is held at high level by the F/F 59 and is supplied to the counter 67. As a result, the counter 67 starts to count 400 lines, and the AND gate 83 is disabled to stop an output from the AND gate 81. Therefore, the vertical shift clock VSC is output as the signal VSC1 with respect to the 400 lines in the valid display region. When the counter 67 counts 400 lines, since an output from the counter 67 sets the initial value "20" in the counter 57 through an inverter 99 and the AND gate 87, the counter 57 counts lines 440 through 479. At the same time, an output from the counter 57 is supplied to the reset terminal of F/F 59 through the inverter 99 and the AND gate 87, the F/F 59 is reset. As a result, the counter 67 is inactivated, and an active signal is supplied to the AND gate 83 through the OR gate 65 and an inverter 101, thus activating the AND gate 83. In addition, an output signal from the AND gate 81 is output as the signal VSC1 through the OR gate 85 again.

The vertical shift clock signal VSC1 for performing a double select operation of the upper and lower non-display regions, each having 40 lines, is generated by the circuit enclosed with the dotted line in FIG. 15. That is, as shown in FIG. 17C, an output from the F/F 73 rises in synchronism with the leading edge of the horizontal sync signal HSYNC shown in FIG. 17A and is held at high level (logic "1" level). Subsequently, an output from the F/F 75 rises in synchronism with the leading edge of a pulse of the clock signal CLK (FIG. 17B), as shown in FIG. 17D, and an output from the F/F 77 rises in synchronism with the leading edge of the next pulse of the clock signal (FIG. 17B). An output from the F/F 79 goes to low level in synchronism with the trailing edges of the output from the F/Fs 75 and 77 and held at low level, as shown in FIG. 17F. Since an output put from F/F 79 is supplied to the reset terminals of the F/Fs 73, 75, and 77, outputs from the F/Fs 73, 75, and 77 fall, as shown in FIGS. 17C through 17E. In addition, the clock signal CLK is inverted by the inverter 103 to obtain the inverted clock signal shown in FIG. 17G. The inverted clock signal is supplied to the AND gate 81. While the Q output from the F/F 75 is kept at high level, the AND gate 81 outputs two clock signals and supplies them to the AND gate 83 in synchronism with the inverted clock shown in FIG. 17G, as shown in FIG. 17H.

This state is indicated by the timing charts in FIGS. 16A through 16M, 17A through 17O, and 21A through 21P.

The respective timing charts indicate a state wherein the 1st line (0 line) through the 40th line (39 lines) (corresponding to upper 40 lines) in the Y direction are doubly selected, the subsequent 41st line (40 lines) through the 440th line (439 lines) are singly selected, and the subsequent 441st line (440 lines) through the 480th line (479 lines) are doubly selected again.

In this manner, the circuit shown in FIG. 15 generates and outputs the vertical shift clocks VSC1 at timings of different periods in accordance with double select/single select operations of lines.

When the F/F 59 is held at high level ("1"), the binary sync up counter (initial value—"400") 67 is selected. At the same time, the OR gate 65 is set at high level ("1"), and the AND gate 71 is selected (open control state), and the AND gate 83 is not selected (closed control state).

With this operation, the vertical sync signal VSC is selected as the vertical shift clock VSC1 until the binary sync up counter 67 counts "400".

When the binary sync up counter 67 completes the count up operation of "400", the binary sync up counter 57 and the F/F 59 are cleared.

The binary sync up counter 57 performs a count operation up to "20". Meanwhile, the circuit enclosed with the dotted line is selected by an output from the OR gate 65, and a signal output from the AND gate 83 is selected as the vertical shift clock VSC1 to be supplied to the Y driver 31.

The vertical shift clock signal VSC1 can be set as one of the following two types of vertical shift clocks by using an output from the OR gate 85: the vertical shift clock VSC for a line scan, which is based on the horizontal sync signal HSYNC generated by the circuit shown in FIG. 13; and the vertical shift clock generated by the circuit shown in FIG. 15, which is continuously supplied two times within one horizontal scan period.

FIGS. 21A through 21H show the timings of the respective signals.

Upon reception of the vertical shift clock VSC1 and the scanning data SD and SD1, the Y driver 31 performs a line scan in the above-mentioned display and non-display periods. The internal arrangement of the Y driver 31 is shown in FIG. 19.

In this embodiment, the shift register is constituted by the 480 F/Fs. When a display resolution of 640×400 dots is set, the scanning data SD is used as an input signal to the 41st F/F, and the scanning data SD1 is used as an input signal to the 441st F/F. When a display resolution of 640×350 dots is set, only the input positions of the scanning data SD and SD1 input to the shift register are changed, and the same double select/single select operation as that described above is performed by the circuit shown in FIG. 15 to perform a line scan.

In each embodiment described above, the circuit for generating the scanning start signal SD is realized by circuit elements such as the counter 25, the register 27, and the comparator 29, and is arranged in the LCD unit. However, the present invention is not limited to the above-described embodiments. For example, the circuit may be realized by another hardware arrangement or an arrangement using the CPU function of the apparatus main body. Furthermore, in each embodiment described above, a 16-gradation level display operation is exemplified. However, the present invention is not limited to this but may be equally applied to other gradation level display operations, other color display panels, and the like.

What is claimed is:

1. A flat panel display control system for a flat panel display unit which can be operated in each mode selected from a plurality of display modes and for a cathode ray tube (CRT) display unit as an option, comprising:
    a CRT controller for outputting vertical and horizontal sync signals for controlling a display timing of said CRT display unit;
    said flat panel display unit being constituted by a single panel and comprising:
    means for discriminating a designated display resolution;
    means for generating, to start a display period of non-display regions, a scanning start signal corresponding to the display resolution discriminated by said discriminating means, and outputting the scanning start signal to said flat panel display unit;
    means for singly scanning a display region during a display period of the display region of said flat panel display; and
    means for simultaneously scanning a plurality of lines of non-display regions of said flat panel display in accordance with the scanning start signal from said scanning start signal generating means.

2. A system according to claim 1, wherein said means for generating the scanning start signal comprises means for generating the scanning start signal on the basis of a back porch period following the vertical sync signal and a total horizontal display line count in a vertical direction with the designated display resolution.

3. A system according to claim 1, wherein said means for discriminating the display resolution comprises means for discriminating a display resolution on the basis of polarities of horizontal and vertical sync signals output from said CRT controller.

4. A system according to claim 1, wherein said means for simultaneously scanning the non-display regions comprises:
    counter means for performing a count operation in synchronism with a vertical sync signal output from said CRT controller;
    means for setting a count value unique to a designated display resolution;
    means for outputting a scanning start signal when said counter means counts the count value unique to the designated display resolution; and
    means for outputting the scanning start signal before a scanning operation with respect to a physical display resolution of an LCD is completed, thereby simultaneously scanning upper and lower non-display portions of said LCD.

5. A system according to claim 1, wherein said means for simultaneously scanning the non-display regions comprises:
    first input means for inputting timing signals including data and vertical and horizontal sync signals generated by said CRT controller;
    second input means for inputting information representing a vertical display resolution supplied from a processing unit to which said display system is connected;
    Y and X drivers for respectively driving vertical and horizontal pixels constituting said LCD; and
    means for generating a scanning start timing signal for said Y driver on the basis of the vertical sync signal and the information representing the display resolution.

6. A display system, comprising:
    a liquid crystal display (LCD) having predetermined number of display dots in vertical and horizontal directions and being constituted by a single panel;
    a CRT controller for outputting vertical and horizontal sync signals for controlling a display timing of a CRT display unit;
    generating means for generating, to start a display period for non-display regions, a scanning start signal for said LCD on the basis of the output vertical sync signal; and
    means for simultaneously scanning a plurality of lines in non-display regions of the LCD in accordance with the scanning start signal from said generating means, wherein, when data is to be displayed on said LCD, a number of display dots in at least one of the vertical and horizontal directions is set to be smaller than a number of display dots of said LCD in a corresponding direction.

7. A system according to claim 6, wherein said means for simultaneously scanning a plurality of lines in the non-display regions comprises:
    means for calculating a timing of generation of a scanning start signal on the basis of the vertical sync signal and a physical dot count of said LCD in the vertical direction; and
    means for simultaneously scanning upper and lower non-display portions of said LCD in response to the scanning signal.

8. A system according to claim 6, wherein said means for simultaneously scanning a plurality of lines in the non-display regions comprises:
    counter means for performing a count operation in synchronism with a vertical sync signal output from said CRT controller;
    means for setting a count value corresponding to a designated display resolution;
    means for causing said counter means to output the count value corresponding to the designated display resolution; and
    means for outputting the scanning start signal before a scanning operation with respect to a physical display resolution of an LCD is completed, thereby simultaneously scanning upper and lower non-display portions of said LCD.

9. A system according to claim 6, further comprising a CRT controller for outputting vertical and horizontal sync signals for controlling a display timing of said CRT display unit, and wherein said means for simultaneously scanning a plurality of lines in non-display regions comprises:
    first input means for inputting timing signals including data and vertical and horizontal sync signals generated by said CRT controller;
    second input means for inputting information representing a vertical display resolution supplied from a processing unit to which said display unit is connected;

X and Y drivers for respectively driving vertical and horizontal pixels constituting said LCD; and means for generating a scanning start timing signal for said Y driver on the basis of the vertical sync signal and the information representing the display resolution.

10. A flat panel display control system for a flat panel display unit which can be operated in each mode selected from a plurality of display modes and for a cathode ray tube (CRT) display unit as an option, comprising:

a CRT controller for outputting vertical and horizontal sync signals for controlling a display timing of said CRT display unit and a signal representing a valid display period of said flat panel display unit;

said flat panel display unit being constituted by a single panel and comprising:

means for generating, to start a display period of non-display regions, a scanning start signal corresponding to a display resolution on the basis of the signal, out from said CRT controller, representing a valid display period of said flat panel display unit, and outputting the scanning start signal to said flat panel display unit;

means for singly scanning a display region of said flat panel display during the valid display period; and means for simultaneously scanning a plurality of lines of non-display regions of said flat panel display in accordance with the scanning start signal from said scanning start signal generating means.

* * * * *